US009794338B2

(12) United States Patent
Matsushima

(10) Patent No.: US 9,794,338 B2
(45) Date of Patent: Oct. 17, 2017

(54) DATA PROCESSING SYSTEM, CONTROL METHOD THEREFOR, PROGRAM AND INFORMATION STORAGE MEDIUM

(71) Applicant: Rakuten, Inc., Tokyo (JP)

(72) Inventor: Katsuhito Matsushima, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 454 days.

(21) Appl. No.: 14/387,845

(22) PCT Filed: Oct. 11, 2012

(86) PCT No.: PCT/JP2012/076364
§ 371 (c)(1),
(2) Date: Sep. 25, 2014

(87) PCT Pub. No.: WO2013/145392
PCT Pub. Date: Oct. 3, 2013

(65) Prior Publication Data
US 2015/0215402 A1    Jul. 30, 2015

(30) Foreign Application Priority Data

Mar. 30, 2012  (JP) ................................ 2012-079314

(51) Int. Cl.
*H04L 29/08*    (2006.01)
*G06F 17/30*    (2006.01)

(52) U.S. Cl.
CPC .... *H04L 67/1097* (2013.01); *G06F 17/30017* (2013.01); *G06F 17/30165* (2013.01); *H04L 67/32* (2013.01)

(58) Field of Classification Search
CPC . H04L 12/2816; H04L 12/2809; H04L 67/32; H04L 67/1097; G06F 9/4411; G06F 17/30165; G06F 17/30017
See application file for complete search history.

(56) References Cited

U.S. PATENT DOCUMENTS

| 2008/0183844 A1* | 7/2008 | Gavin | G06Q 30/06 |
|---|---|---|---|
| | | | 709/217 |
| 2011/0029883 A1* | 2/2011 | Lussier | G11B 27/034 |
| | | | 715/738 |

(Continued)

FOREIGN PATENT DOCUMENTS

| JP | H06-197214 A | 7/1994 |
|---|---|---|
| JP | H09-181905 A | 7/1997 |

(Continued)

OTHER PUBLICATIONS

International Search Report for PCT/JP2012/076364 dated Nov. 13, 2012.

*Primary Examiner* — Dustin Nguyen
*Assistant Examiner* — Juan C Turriate Gastulo
(74) *Attorney, Agent, or Firm* — Hubbs, Enatsky & Inoue PLLC

(57) ABSTRACT

Provided is a data processing system capable of alleviating a communication load when data downloaded from a first system to a user device is processed thereon and the processed data is uploaded to a second system. A process instruction receiving section receives a processing instruction operation performed with original data or alternative data with regard to the original data as a process target. Original data acquisition information for acquiring the original data from a storage device and processing instruction information on the processing instruction operation performed on data as a process target are transmitted from a user device to a data processing device. The original data is acquired from the storage device based on the received original data acquisition information, and the original data is processed based on the received processing instruction information, thereby generating processed data.

13 Claims, 11 Drawing Sheets

(56) References Cited

U.S. PATENT DOCUMENTS

2011/0254857 A1* 10/2011 Sakurai ................ G06T 11/203
  345/629
2012/0134555 A1* 5/2012 Iizuka ................ G06F 19/3487
  382/128

FOREIGN PATENT DOCUMENTS

| JP | 2003-108408 A | 4/2003 |
|---|---|---|
| WO | 2011/014789 A1 | 2/2011 |

* cited by examiner

FIG.8

```
request
    { url: http://www.xxx.com/yyy/zzz.jpg }       } 90
    { command: line
        { type: straight }
        { color: blue }
            ...                                    } 92
        { positionx1: 150, positiony1: 600 }
        { positionx2: 800, positiony2: 600 } }
    { command: stamp
        { type: star }
        { color: red }                             } 94
            ...
        { positionx: 850, positiony: 100 } }
```

FIG.10

| IMAGE ID | USER ID | IMAGE | COMMENT | POSTED DATE/TIME |
|---|---|---|---|---|
| P0001 | U0001 | --- | --- | --- |
| P0002 | U0002 | --- | --- | --- |
| ... | ... | ... | ... | ... |

DATA PROCESSING SYSTEM, CONTROL METHOD THEREFOR, PROGRAM AND INFORMATION STORAGE MEDIUM

This application is a National Stage of International Application No. PCT/JP2012/076364 filed on Oct. 11, 2012, claiming priority based on Japanese Patent Application No. 2012-079314 filed on Mar. 30, 2012. The contents of each of the above documents are incorporated herein by reference in their entirety.

TECHNICAL FIELD

The present invention relates to a data processing system, a control method for a data processing system, a user device, a control method for a user device, a data processing device, a control method for a data processing device, a program, and an information storage medium.

BACKGROUND ART

There is known a system for providing a service that stores data such as a still image, a moving image, or a sound uploaded from a user device. For example, there is known a service that allows the data uploaded from the user device to be shared between limited users, a service that makes the data uploaded (posted) from the user device public, or other such service.

CITATION LIST

Patent Literature

[Patent Literature 1] JP 2003-108408 A

SUMMARY OF INVENTION

Technical Problem

Incidentally, there is a case where a user wishes to process data downloaded from a first system to a user device on the user device and upload the processed data from the user device to a second system. In such a case, a communication load may increase when the processed data is uploaded from the user device to the second system.

The present invention has been made in view of the above-mentioned problem, and an object thereof is to provide a data processing system, a control method for a data processing system, a user device, a control method for a user device, a data processing device, a control method for a data processing device, a program, and an information storage medium, which are capable of alleviating a communication load when data downloaded from a first system to a user device is processed on the user device and then the processed data is uploaded from the user device to a second system.

In order to solve the above-mentioned problem, a data processing system according to one embodiment of the present invention is a data processing system including: a storage device that stores original data; a user device; and a data processing device, the user device including: data receiving means for receiving the original data or alternative data with regard to the original data through a communication network, the alternative data being data generated based on the original data; processing instruction receiving means for receiving a processing instruction operation performed by a user with data received by the data receiving means as a process target; original data acquisition information transmitting means for transmitting original data acquisition information to the data processing device through the communication network, the original data acquisition information being information which is used to acquire the original data from the storage device; and processing instruction information transmitting means for transmitting processing instruction information to the data processing device through the communication network, the processing instruction information being information relating to a content of the processing instruction operation performed for the process target data, the data processing device including: original data acquisition means for acquiring the original data from the storage device based on the original data acquisition information transmitted from the user device; processed data generation means for generating processed data by processing the original data acquired by the original data acquisition means based on the processing instruction information transmitted from the user device; and processed data saving means for saving the processed data to storage means. Note that, the "storage means" to which the processed data is saved may be provided to any one of the storage device, the data processing device, and another device (other than the user device).

Further, a control method for a data processing system according to one embodiment of the present invention is a control method for a data processing system, the data processing system including: a storage device that stores original data; a user device; and a data processing device, the control method including: a data receiving step of receiving, by the user device, the original data or alternative data with regard to the original data through a communication network, the alternative data being data generated based on the original data; a processing instruction receiving step of receiving, by the user device, a processing instruction operation performed by a user with data received in the data receiving step as a process target; an original data acquisition information transmitting step of transmitting, by the user device, original data acquisition information to the data processing device through the communication network, the original data acquisition information being information which is used to acquire the original data from the storage device; a processing instruction information transmitting step of transmitting, by the user device, processing instruction information to the data processing device through the communication network, the processing instruction information being information relating to a content of the processing instruction operation performed for the process target data; an original data acquisition step of acquiring, by the data processing device, the original data from the storage device based on the original data acquisition information transmitted from the user device; a processed data generation step of generating, by the data processing device, processed data by processing the original data acquired in the original data acquisition step based on the processing instruction information transmitted from the user device; and a processed data saving step of saving, by the data processing device, the processed data to storage means. Note that, the "storage means" to which the processed data is saved may be provided to any one of the storage device, the data processing device, and another device (other than the user device).

Further, a user device according to one embodiment of the present invention is a user device, that is configured to communicate with a data processing device for acquiring and processing original data stored in a storage device, the user device including: data receiving means for receiving the original data stored in the storage device or alternative data with regard to the original data through a communication network, the alternative data being data generated based on the original data; processing instruction receiving means for receiving a processing instruction operation performed by a user with data received by the data receiving means as a process target; original data acquisition information transmitting means for transmitting original data acquisition information to the data processing device through the communication network, the original data acquisition information being information which is used to acquire the original data from the storage device; and processing instruction information transmitting means for transmitting processing instruction information to the data processing device through the communication network, the processing instruction information being information relating to a content of the processing instruction operation performed for the process target data.

Further, a control method for a user device according to one embodiment of the present invention is a control method for a user device, the user device being configured to communicate with a data processing device that acquires and processes original data stored in a storage device, the control method including: a data receiving step of receiving the original data stored in the storage device or alternative data with regard to the original data through a communication network, the alternative data being data generated based on the original data; a processing instruction receiving step of receiving a processing instruction operation performed by a user with data received in the data receiving step as a process target; an original data acquisition information transmitting step of transmitting original data acquisition information to the data processing device through the communication network, the original data acquisition information being information which is used to acquire the original data from the storage device; and a processing instruction information transmitting step of transmitting processing instruction information to the data processing device through the communication network, the processing instruction information being information relating to a content of the processing instruction operation performed for the process target data.

Further, a program according to one embodiment of the present invention is a program for causing a computer to function as a user device, the user device being configured to communicate with a data processing device that acquires and processes original data stored in a storage device, the program causing the computer to function as: data receiving means for receiving the original data stored in the storage device or alternative data with regard to the original data through a communication network, the alternative data being data generated based on the original data; processing instruction receiving means for receiving a processing instruction operation performed by a user with data received by the data receiving means as a process target; original data acquisition information transmitting means for transmitting original data acquisition information to the data processing device through the communication network, the original data acquisition information being information which is used to acquire the original data from the storage device; and processing instruction information transmitting means for transmitting processing instruction information to the data processing device through the communication network, the processing instruction information being information relating to a content of the processing instruction operation performed for the process target data.

Further, a computer-readable information storage medium according to one embodiment of the present invention is a computer-readable information storage medium storing a program for causing a computer to function as a user device, the user device being configured to communicate with a data processing device that acquires and processes original data stored in a storage device, the program causing the computer to function as: data receiving means for receiving the original data stored in the storage device or alternative data with regard to the original data through a communication network, the alternative data being data generated based on the original data; processing instruction receiving means for receiving a processing instruction operation performed by a user with data received by the data receiving means as a process target; original data acquisition information transmitting means for transmitting original data acquisition information to the data processing device through the communication network, the original data acquisition information being information which is used to acquire the original data from the storage device; and processing instruction information transmitting means for transmitting processing instruction information to the data processing device through the communication network, the processing instruction information being information relating to a content of the processing instruction operation performed for the process target data.

Further, a data processing device according to one embodiment of the present invention is a data processing device, that is configured to communicate with a user device and is configured to acquire and process original data stored in a storage device that stores the original data, the data processing device including: original data acquisition information receiving means for receiving original data acquisition information in a case where the original data acquisition information is transmitted from the user device, the original data acquisition information being information which is used to acquire the original data from the storage device; processing instruction information receiving means for receiving processing instruction information in a case where the processing instruction information is transmitted from the user device, the processing instruction information being information which indicates a content of a processing instruction operation performed on the user device by using the original data or alternative data with regard to the original data as a process target, the alternative data being data generated based on the original data; original data acquisition means for acquiring the original data from the storage device based on the original data acquisition information; processed data generation means for generating processed data by processing the original data acquired by the original data acquisition means based on the processing instruction information; and processed data saving means for saving the processed data to storage means. Note that, the "storage means" to which the processed data is saved may be provided to any one of the storage device, the data processing device, and another device (other than the user device).

Further, a control method for a data processing device according to one embodiment of the present invention is a control method for a data processing device, the data processing device being configured to communicate with a user device and being configured to acquire and process original data stored in a storage device that stores the original data, the control method including: an original data acquisition information receiving step of receiving original data acquisition information in a case where the original data acquisition information is transmitted from the user device, the original data acquisition information being information which is used to acquire the original data from the storage device; a processing instruction information receiving step of receiving processing instruction information in a case where the processing instruction information is transmitted from the user device, the processing instruction information being information which indicates a content of a processing instruction operation performed on the user device by using the original data or alternative data with regard to the original data as a process target, the alternative data being data generated based on the original data; an original data acquisition step of acquiring the original data from the storage device based on the original data acquisition information; a processed data generation step of generating processed data by processing the original data acquired in the original data acquisition step based on the processing instruction information; and a processed data saving step of saving the processed data to storage means. Note that, the "storage means" to which the processed data is saved may be provided to any one of the storage device, the data processing device, and another device (other than the user device).

Further, a program according to one embodiment of the present invention is a program for causing a computer that is configured to communicate with a user device to function as a data processing device for acquiring and processing original data stored in a storage device that stores the original data, the program causing the computer to function as: original data acquisition information receiving means for receiving original data acquisition information in a case where the original data acquisition information is transmitted from the user device, the original data acquisition information being information which is used to acquire the original data from the storage device; processing instruction information receiving means for receiving processing instruction information in a case where the processing instruction information is transmitted from the user device, the processing instruction information being information which indicates a content of a processing instruction operation performed on the user device by using the original data or alternative data with regard to the original data as a process target, the alternative data being data generated based on the original data; original data acquisition means for acquiring the original data from the storage device based on the original data acquisition information; processed data generation means for generating processed data by processing the original data acquired by the original data acquisition means based on the processing instruction information; and processed data saving means for saving the processed data to storage means. Note that, the "storage means" to which the processed data is saved may be provided to any one of the storage device, the data processing device, and another device (other than the user device).

Further, a computer-readable information storage medium according to one embodiment of the present invention is provided a computer-readable information storage medium storing a program for causing a computer that is configured to communicate with a user device to function as a data processing device for acquiring and processing original data stored in a storage device that stores the original data, the program causing the computer to function as: original data acquisition information receiving means for receiving original data acquisition information in a case where the original data acquisition information is transmitted from the user device, the original data acquisition information being information which is used to acquire the original data from the storage device; processing instruction information receiving means for receiving processing instruction information in a case where the processing instruction information is transmitted from the user device, the processing instruction information being information which indicates a content of a processing instruction operation performed on the user device by using the original data or alternative data with regard to the original data as a process target, the alternative data being data generated based on the original data; original data acquisition means for acquiring the original data from the storage device based on the original data acquisition information; processed data generation means for generating processed data by processing the original data acquired by the original data acquisition means based on the processing instruction information; and processed data saving means for saving the processed data to storage means. Note that, the "storage means" to which the processed data is saved may be provided to any one of the storage device, the data processing device, and another device (other than the user device).

Further, in an aspect of the present invention: the user device may include means for recording a history of the processing instruction operation performed for the process target data into history storage means; and the processing instruction information transmitting means may transmit, in a case where the processing with respect to the process target data is completed on the user device, information relating to the history of the processing instruction operation performed for the process target data to the data processing device as the processing instruction information.

Further, in an aspect of the present invention: the original data acquisition information transmitting means may transmit, before the processing with respect to the process target data is completed on the user device, the original data acquisition information to the data processing device; the processing instruction information transmitting means may transmit, after the processing with respect to the process target data is started on the user device and before the processing with respect to the process target data is completed on the user device, processing instruction information indicating the content of the processing instruction operation that has been performed for the process target data so far to the data processing device; the original data acquisition means may acquire, before the processing with respect to the process target data is completed on the user device, the original data from the storage device; and the processed data generation means may start, before the processing with respect to the process target data is completed on the user device, the processing with respect to the original data based on the processing instruction information transmitted from the user device.

Further, in an aspect of the present invention: the alternative data may be data having a data amount smaller in size than that of the original data; the data receiving means may receive the alternative data through the communication network; the processing instruction receiving means may receive the processing instruction operation performed by the user with the alternative data as the process target; the processing instruction information transmitting means may transmit the processing instruction information relating to the content of the processing instruction operation performed by the user with the alternative data as the process target to the data processing device through the communication network; and the processed data generation means may generate the processed data by processing the original data acquired by the original data acquisition means based on the processing instruction information relating to the content of the processing instruction operation performed by the user with the alternative data as the process target.

Further, in an aspect of the present invention: the original data may be data on an original still image; the alternative data may be data on a reduced image obtained by reducing the original still image in size; and the original still image acquired by the original data acquisition means may be processed based on the content of the processing instruction operation performed by the user with the alternative data as the process target and a ratio of a size between the original still image and the reduced image, to thereby generate a processed image as the processed data.

Further, in an aspect of the present invention, a position relating to a processing to be performed with respect to the original still image may be identified based on a position relating to a processing performed with respect to the reduced image by the user and the ratio of the size between the reduced image and the original still image.

Further, in an aspect of the present invention: the processing instruction information may include information indicating the position relating to the processing performed with respect to the reduced image by the user by a coordinate value in a first axial direction within the reduced image and a coordinate value in a second axial direction orthogonal to the first axial direction within the reduced image; and the processed data generation means may include: first acquisition means for acquiring the coordinate value in the first axial direction of the position relating to the processing to be performed with respect to the original still image based on the coordinate value in the first axial direction of the position relating to the processing performed with respect to the reduced image by the user and a ratio of a length in the first axial direction between the reduced image and the original still image; second acquisition means for acquiring the coordinate value in the second axial direction of the position relating to the processing to be performed with respect to the original still image based on the coordinate value in the second axial direction of the position relating to the processing performed with respect to the reduced image by the user and a ratio of a length in the second axial direction between the reduced image and the original still image; and means for generating the processed image by processing the original still image acquired by the original data acquisition means based on the coordinate values acquired by the first acquisition means and the second acquisition means.

Further, in an aspect of the present invention: the processing instruction information may include information indicating the position relating to the processing performed with respect to the reduced image by the user by a first normalized coordinate value and a second normalized coordinate value, the first normalized coordinate value being obtained by dividing a coordinate value in a first axial direction within the reduced image by a length in the first axial direction of the reduced image, the second normalized coordinate value being obtained by dividing a coordinate value in a second axial direction orthogonal to the first axial direction within the reduced image by a length in the second axial direction of the reduced image; and the processed data generation means may include: first acquisition means for acquiring the coordinate value in the first axial direction of the position relating to the processing to be performed with respect to the original still image based on the first normalized coordinate value of the position relating to the processing performed with respect to the reduced image by the user and a length in the first axial direction of the original still image; second acquisition means for acquiring the coordinate value in the second axial direction of the position relating to the processing to be performed with respect to the original still image based on the second normalized coordinate value of the position relating to the processing performed with respect to the reduced image by the user and a length in the second axial direction of the original still image; and means for generating the processed image by processing the original still image acquired by the original data acquisition means based on the coordinate values acquired by the first acquisition means and the second acquisition means.

Further, in an aspect of the present invention: the user device may include: first acquisition means for acquiring a coordinate value in a first axial direction of the position relating to the processing to be performed with respect to the original still image based on a ratio of a length in the first axial direction between the reduced image and the original still image and a coordinate value in the first axial direction of the position relating to the processing performed with respect to the reduced image by the user; and second acquisition means for acquiring a coordinate value in a second axial direction orthogonal to the first axial direction of the position relating to the processing to be performed with respect to the original still image based on a ratio of a length in the second axial direction between the reduced image and the original still image and a coordinate value in the second axial direction of the position relating to the processing performed with respect to the reduced image by the user; the processing instruction information may include positional information indicating the position relating to the processing to be performed with respect to the original still image by the coordinate values acquired by the first acquisition means and the second acquisition means; and the processed data generation means may identify the position relating to the processing to be performed with respect to the original still image based on the positional information included in the processing instruction information.

Further, in an aspect of the present invention: the original data may be data on an original moving image or an original sound; the processed data generation means may generate a processed moving image or a processed sound by processing the original moving image or the original sound acquired by the original data acquisition means based on the processing instruction information transmitted from the user device; the data processing device may include means for subjecting the processed moving image or the processed sound to encoding processing; and the processed data saving means may save the processed moving image or the processed sound subjected to the encoding processing to the storage means.

Advantageous Effects of Invention

According to one embodiment of the present invention, for example, it is possible to alleviate the communication load when the data downloaded from the first system to the user device is processed on the user device and then the processed data is uploaded from the user device to the second system.

BRIEF DESCRIPTION OF DRAWINGS

FIG. 8 is a diagram illustrating an example of processing instruction information.

FIG. 10 shows an example of an image table.

DESCRIPTION OF EMBODIMENTS

Now, a detailed description is made of examples of an embodiment of the present invention with reference to the accompanying drawings.

Figure 1:
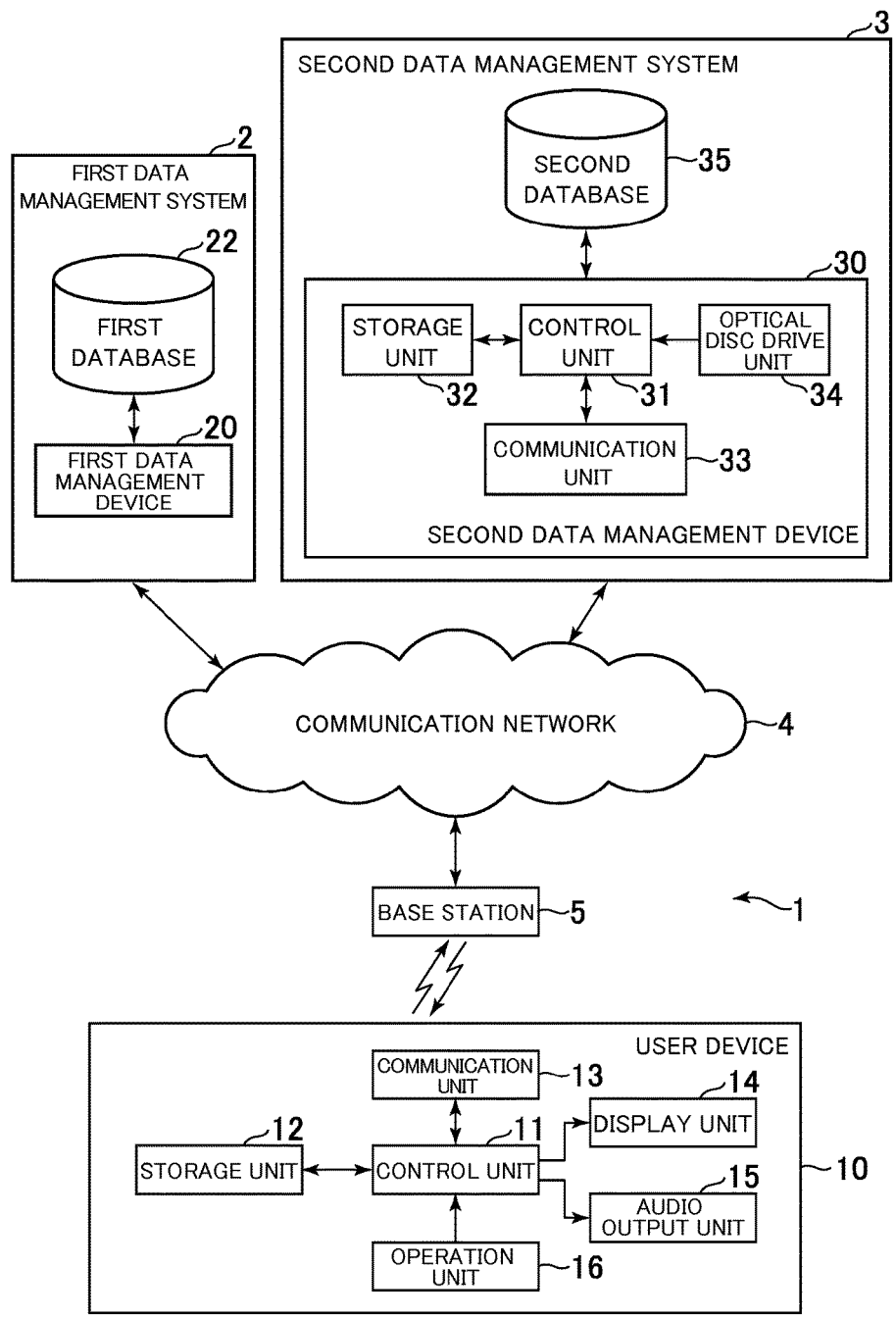
FIG. 1 is a diagram illustrating an example of an overall configuration of a data processing system according to an embodiment of the present invention.

[First Embodiment] The first embodiment of the present invention is described. FIG. 1 illustrates an overall configuration of a data processing system according to the first embodiment of the present invention. As illustrated in FIG. 1, a data processing system 1 according to this embodiment includes a first data management system 2, a second data management system 3, and a user device 10.

Figure 2:
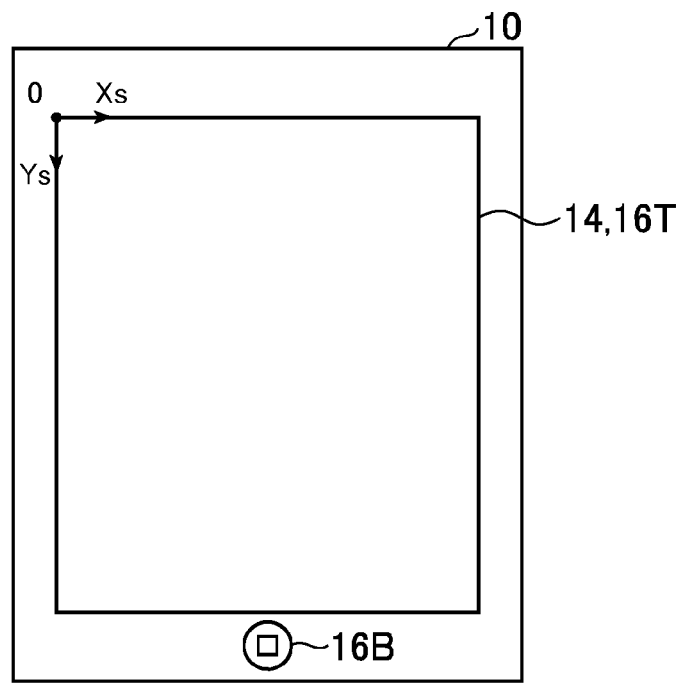
FIG. 2 is a diagram illustrating an example of an external appearance of a user device.

The user device 10 is an information processing device used by a user. For example, the user device 10 is a cellular phone (smartphone), a tablet computer, a laptop computer, or the like. The following description is made by assuming that the user device 10 is a cellular phone (smartphone). FIG. 2 illustrates an example of an external appearance of the user device 10.

The user device 10 includes a control unit 11, a storage unit 12, a communication unit 13, a display unit 14, an audio output unit 15, and an operation unit 16. The control unit 11 includes, for example, one or a plurality of microprocessors, and executes information processing in accordance with an operating system or a program stored in the storage unit 12. The storage unit 12 includes a main storage unit and an auxiliary storage unit.

The communication unit 13 serves to perform data communications to/from another device through a cellular phone network. The communication unit 13 transmits data to another device via a base station 5 of cellular phone, and receives data transmitted from another device via the base station 5. The user device 10 can mutually exchange data with the first data management system 2 or the second data management system 3.

The program or the data is supplied to the storage unit 12 through a communication network 4. That is, the program or the data transmitted through the communication network is received by the user device 10 and stored in the storage unit 12. Note that, the user device 10 may include a component for reading a program or data stored in an information storage medium (for example, optical disc or memory card). Then, the program or the data read from the information storage medium may be stored in the storage unit 12.

The display unit 14 is, for example, a liquid crystal display unit, an organic EL display unit, or the like, and displays a screen in accordance with an instruction of the control unit 11. The audio output unit 15 is, for example, speakers or headphones, and outputs a sound in accordance with an instruction of the control unit 11.

The operation unit 16 is used by the user when performing an operation. For example, the operation unit 16 includes a button 16B provided on a front surface of the user device 10. Note that, the operation unit 16 may include an operation member (for example, stick or lever) other than the button 16B.

Further, the operation unit 16 includes a pointed position detection section for detecting a position within the screen of the display unit 14 pointed by the user. For example, the operation unit 16 includes a touch panel 16T provided so as to be overlaid on the display unit 14. The touch panel 16T is a general touch panel, and detects a position touched by the user.

Information indicating the position being touched by the user is supplied to the control unit 11 every predetermined time period (for example, every 1/60 of a second). For example, the position being touched by the user is expressed as coordinate values of a screen coordinate system. The "screen coordinate system" represents a coordinate system that sets the top-left vertex of the display unit 14 as an origin O, the rightward direction as the Xs-axis positive direction, and the downward direction as the Ys-axis positive direction as illustrated in FIG. 2.

The first data management system 2 is a system for providing a service that stores (manages) data such as a still image, a moving image, or a sound uploaded from the user device 10. The first data management system 2 includes a first data management device 20 and a first database 22 (storage device). The first data management device 20 is, for example, a server computer, and the first data management device 20 has the same hardware configuration as a second data management device 30 described later.

Further, the first data management device 20 can access the first database 22. The first database 22 stores the data such as the still image, the moving image, or the sound. Note that, the first database 22 may be built on a different server computer other than the first data management device 20, or may be built on the first data management device 20.

The second data management system 3 is a system for providing a service that stores (manages) data such as a still image, a moving image, or a sound uploaded from the user device 10. For example, the second data management system 3 provides a social networking service. That is, the second data management system 3 provides a service that receives a post of the data such as the still image, the moving image, or the sound and makes the data public.

The second data management system 3 includes the second data management device 30 (data processing device) and a second database 35. The second data management device 30 is, for example, a server computer, and the second data management device 30 includes a control unit 31, a storage unit 32, a communication unit 33, and an optical disc drive unit 34. The control unit 31 and the storage unit 32 are the same as the control unit 11 and the storage unit 12 of the user device 10.

The communication unit 33 serves to perform data communications to/from another device through the communication network 4. The second data management device 30 can mutually exchange data with the user device 10 or the first data management system 2. Note that, the data communications between the second data management device 30 and the first data management system 2 are executed without the intermediation of the cellular phone network, and hence the data communications can be performed between the second data management device 30 and the first data management system 2 at a higher speed than that of the data communications between the user device 10 and the second data management device 30 or the data communications between the user device 10 and the first data management system 2.

The optical disc drive unit 34 serves to read the program or the data stored in the optical disc (information storage medium). The program or the data read from the optical disc by the optical disc drive unit 34 is stored in the storage unit 32. Note that, the second data management device 30 may include a component for reading a program or data stored in the information storage medium (for example, memory card) other than the optical disc in place of the optical disc drive unit 34. Then, the program or the data may be supplied to the storage unit 32 via the information storage medium other than the optical disc. Alternatively, the program or the data may be supplied to the storage unit 32 through the communication network 4.

The second data management device 30 can access the second database 35. The second database 35 stores data such as the still image, the moving image, the sound, or the like posted by the user. Note that, the second database 35 may be built on a different server computer other than the second data management device 30, or may be built on the second data management device 30.

In the data processing system 1 according to this embodiment, the user can download the data such as the still image, the moving image, and the sound stored in the first data management system 2 onto the user device 10, process the downloaded data on the user device 10, and post (upload) the processed data from the user device 10 onto the second data management system 3.

A description is made of a procedure for processing and posting data. Note that, the following description is directed to a case where the still image is processed and posted. FIGS. 3 to 6 illustrate an example of the screen displayed on the display unit 14 of the user device 10 in the course of processing and posting the still image.

To process and post the still image, the user first launches an application program for processing and posting the still image on the user device 10. When the application program is launched, an authentication processing for using the service provided by the second data management system 3 is executed. When the authentication processing is normally finished, a selection screen for selecting a process target image from among still images stored in the first data management system 2 is displayed on the display unit 14.

Figure 3:
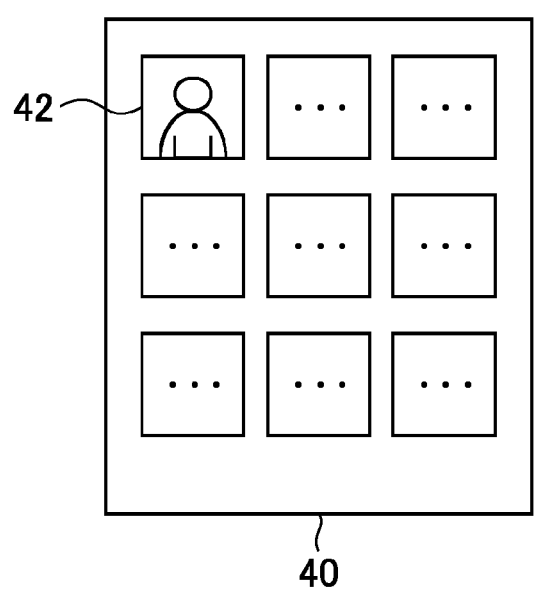
FIG. 3 is a diagram illustrating an example of a selection screen.

FIG. 3 illustrates an example of the selection screen. As illustrated in FIG. 3, a plurality of thumbnail images 42 are displayed on a selection screen 40. The thumbnail image 42 is an image generated by reducing an original still image (original image) in size.

The user selects the process target image by selecting any one out of the plurality of thumbnail images 42 displayed on the selection screen 40. For example, the user selects any one of the plurality of thumbnail images 42 displayed on the selection screen 40 by touching his/her finger or the like to the touch panel 16T.

On the selection screen 40, link information on (URL of) the original image is associated with each of the thumbnail images 42. When any one of the thumbnail images 42 is selected, the user device 10 requests the first data management system 2 for the original image based on the link information associated with the thumbnail image 42. In this case, the first data management system 2 transmits the original image to the user device 10. In this manner, the user device 10 downloads the still image selected as the process target image from the first data management system 2.

Figure 4:
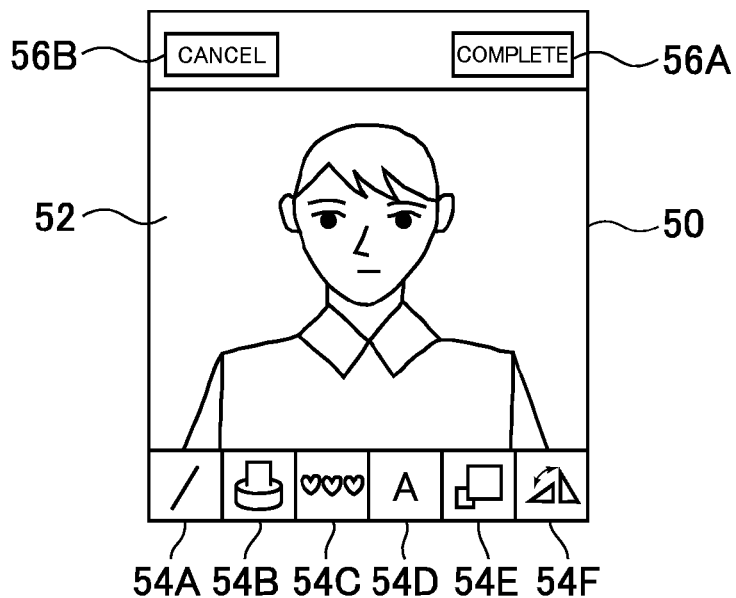
FIG. 4 is a diagram illustrating an example of a processing screen.

When the process target image is selected, a processing screen for processing the process target image is displayed on the display unit 14. FIG. 4 illustrates an example of the processing screen. As illustrated in FIG. 4, a process target image 52 is displayed on a processing screen 50. Further, the processing screen 50 includes menu buttons 54A, 54B, 54C, 54D, 54E, and 54F for processing the process target image 52.

The menu button 54A is a button for drawing a line inside the process target image 52. For example, the menu button 54A is pressed to draw a straight line, a curve, or the like inside the process target image 52. When the menu button 54A is pressed, a menu for selecting a kind, a color, and the like of the line is displayed inside the processing screen 50. Further, the user designates a position where the line is to be drawn by sliding his/her finger or the like inside the process target image 52.

The menu button 54B is a button for putting a stamp inside the process target image 52. For example, the menu button 54B is pressed to draw the stamp of a star mark or the like inside the process target image 52. When the menu button 54B is pressed, a menu for selecting a kind, a color, and the like of the stamp is displayed inside the processing screen 50. Further, the user designates a position where the stamp is to be put by touching an inside of the process target image 52 with his/her finger or the like.

The menu button 54C is a button for applying a decoration to the inside of the process target image 52. For example, the menu button 54C is pressed to draw the decoration of a group of small heart marks or the like inside the process target image 52. When the menu button 54C is pressed, a menu for selecting a kind, a color, and the like of the decoration is displayed inside the processing screen 50. Further, the user designates a position where the decoration is to be applied by touching the inside of the process target image 52 with his/her finger or the like.

The menu button 54D is a button for drawing a character inside the process target image 52. When the menu button 54D is pressed, a menu for selecting a kind, a color, and the like of the character is displayed inside the processing screen 50. Further, the user designates a position where the character is to be drawn by touching the inside of the process target image 52 with his/her finger or the like.

The menu button 54E is a button for enlarging the process target image 52 or reducing the process target image 52 in size. When the menu button 54E is pressed, a menu for selecting an enlargement ratio, a reduction ratio, or the like of the process target image 52 is displayed inside the processing screen 50. The user enlarges the process target image 52 or reduces the process target image 52 in size by selecting the enlargement ratio, the reduction ratio, or the like.

The menu button 54F is a button for rotating the process target image 52. When the menu button 54F is pressed, a menu for selecting a rotational direction, a rotation angle, and the like of the process target image 52 is displayed inside the processing screen 50. The user rotates the process target image 52 by selecting the rotational direction, the rotation angle, and the like.

Figure 5:
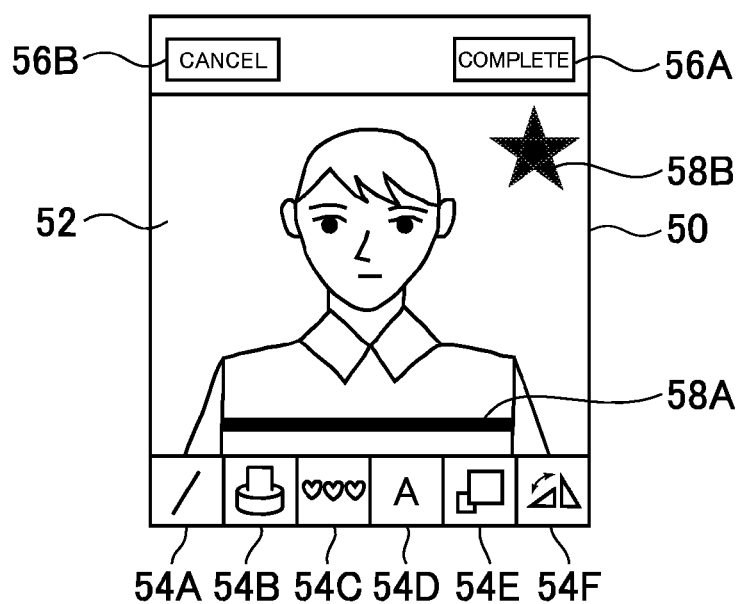
FIG. 5 is a diagram illustrating an example of a processed process target image.

FIG. 5 illustrates an example of the processed process target image 52. In the example illustrated in FIG. 5, a straight line 58A and a star mark 58B have been added.

Further, the processing screen 50 includes a complete button 56A and a cancel button 56B. The complete button 56A is a button pressed when the processing for the process target image 52 is finished. On the other hand, the cancel button 56B is a button pressed to cancel the processing for the process target image 52. When the cancel button 56B is pressed, the selection screen 40 is displayed on the display unit 14.

Figure 6:
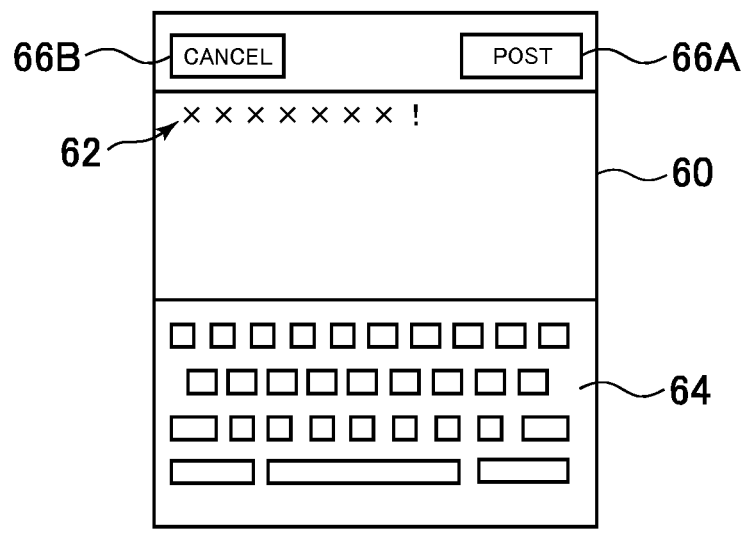
FIG. 6 is a diagram illustrating an example of a comment screen.

When the complete button 56A is pressed, a comment screen for inputting a comment relating to the processed process target image 52 is displayed on the display unit 14. FIG. 6 illustrates an example of the comment screen. As illustrated in FIG. 6, a comment screen 60 includes a software keyboard 64, and a comment 62 that the user input with the software keyboard 64 is displayed on the comment screen 60.

Further, the comment screen 60 includes a post button 66A and a cancel button 66B. The post button 66A is a button pressed when the input of the comment 62 is finished. On the other hand, the cancel button 66B is a button pressed to cancel the input of the comment 62. When the cancel button 66B is pressed, the processing screen 50 is displayed on the display unit 14.

When the post button 66A is pressed, the processed process target image 52 and the input comment 62 are registered in the second data management system 3. The process target image 52 and the comment 62 that have been registered are made public to other users.

In the data processing system 1, a communication load is alleviated in case processed data (such as still image, moving image, or sound) is uploaded from the user device 10 onto the second data management system 3. Specifically, in the data processing system 1, the communication load is alleviated by not uploading processed data (such as still image, moving image, or sound) itself from the user device 10 onto the second data management system 3. Now, a description is made of the above-mentioned configuration for alleviating the communication load.

Figure 7:
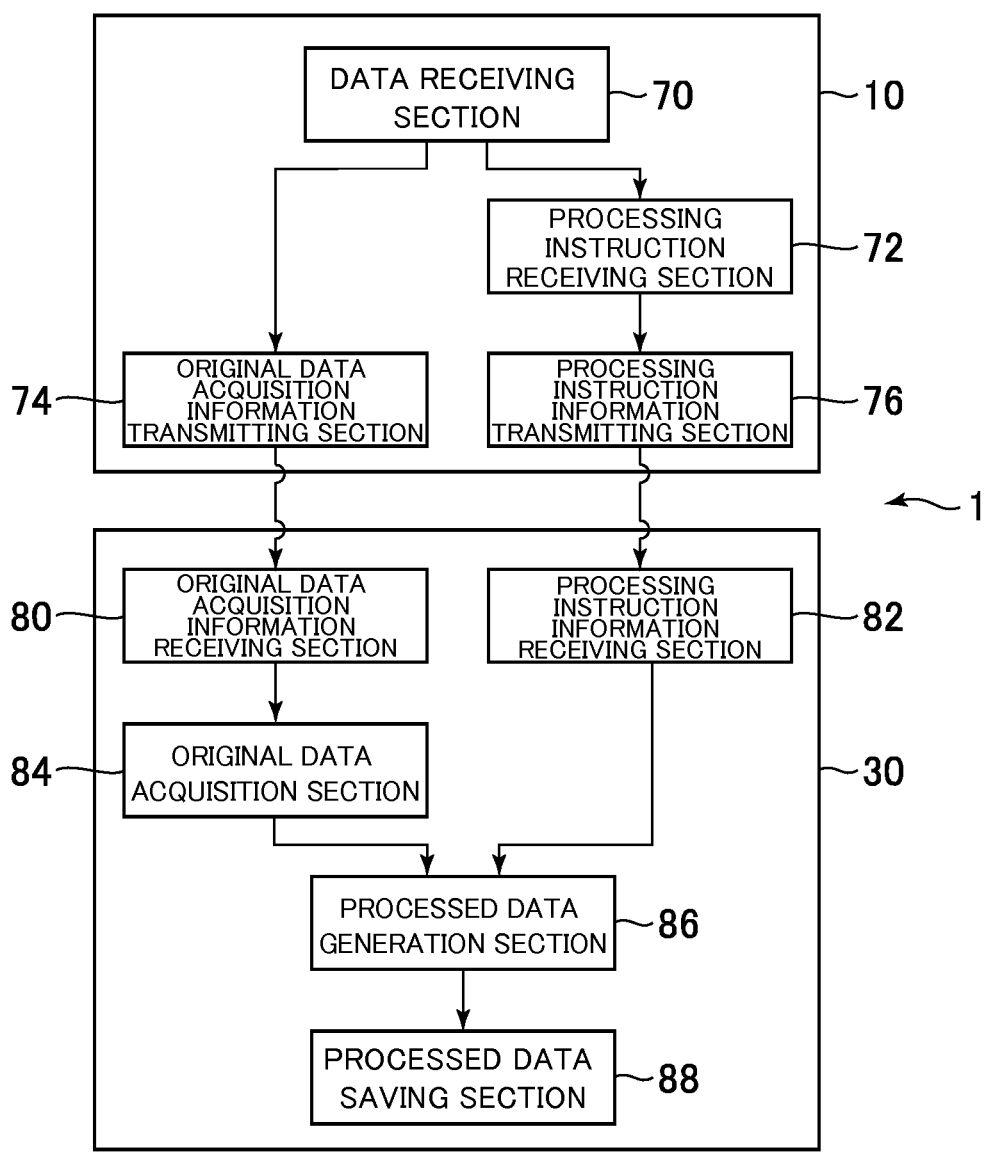
FIG. 7 is a functional block diagram illustrating the data processing system according to the embodiment of the present invention.

FIG. 7 is a functional block diagram illustrating functional blocks relating to the present invention among functional blocks implemented by the data processing system 1.

As illustrated in FIG. 7, the data processing system 1 includes a data receiving section 70, a processing instruction receiving section 72, an original data acquisition information transmitting section 74, and a processing instruction information transmitting section 76. Those functional blocks are implemented by the user device 10. That is, the control unit 11 of the user device 10 executes the processing in accordance with the program, to thereby cause the control unit 11 to function as those functional blocks. Those functional blocks are described below.

First, the data receiving section 70 is described. The data receiving section 70 receives original data stored in the first database 22 through the communication network 4. Here, the "original data" represents original data such as the still image, the moving image, or the sound, and the "original data" means data before being processed.

The processing instruction receiving section 72 is described. The processing instruction receiving section 72 receives a processing instruction operation performed by the user with the data received by the data receiving section 70 as a process target. For example, the processing instruction receiving section 72 displays the processing screen 50 on the display unit 14, and receives the processing instruction operation for the process target image 52.

The original data acquisition information transmitting section 74 is described. The original data acquisition information transmitting section 74 transmits original data acquisition information for acquiring original data from the first database 22 (first data management system 2), to the second data management device 30 through the communication network 4.

Here, the "original data acquisition information" represents, for example, the link information on (URL of) the original data. Note that, the "original data acquisition information" may be any information as long as it is information for acquiring the original data from the first database 22 (first data management system 2).

The processing instruction information transmitting section is described. The processing instruction information transmitting section 76 transmits processing instruction information relating to a content of the processing instruction operation performed for the process target data, to the second data management device 30 through the communication network 4.

For example, the processing instruction information transmitting section 76 records a history of the processing instruction operation performed for the process target data into the storage unit 12. That is, the processing instruction information transmitting section 76 records the history of the processing instruction operation performed on the processing screen 50 into the storage unit 12.

When the processing with respect to the process target data is completed on the user device 10, the processing instruction information transmitting section 76 transmits information relating to the history of the processing instruction operation performed for the process target data to the second data management device 30 as the processing instruction information. That is, when a complete button 56A of the processing screen 50 is pressed, the processing instruction information transmitting section 76 transmits the information relating to the history of the processing instruction operation performed on the processing screen 50 to the second data management device 30 as the processing instruction information.

For example, the processing instruction information is text information of extensible markup language (xml) format, a JavaScript object notation (j son) format, or the like. Note that, the processing instruction information may be information of another format.

FIG. 8 illustrates an example of the processing instruction information. The processing instruction information illustrated in FIG. 8 corresponds to an example of the process illustrated in FIG. 5. Note that, the part 90 of the processing instruction information illustrated in FIG. 8 indicates the link information on (URL of) the original image (original data). This link information corresponds to the above-mentioned "original data acquisition information".

For example, when the processing instruction operation for adding an object to the process target image 52 is performed, the processing instruction information includes the information indicating the fact that an operation for adding the object to the process target image 52 has been performed and an attribute (for example, kind, color, position, or the like) of the object.

The part 92 of the processing instruction information illustrated in FIG. 8 indicates the fact that the operation for drawing a line has been performed and the attributes of the line. More specifically, it is indicated that the straight line 58A, which is blue, has been drawn inside the process target image 52. Note that, "positionx1" and "positiony1" indicate position coordinates of a start point of the straight line 58A, and "positionx2" and "positiony2" indicate position coordinates of an end point of the straight line 58A. The position coordinates of the start point or the endpoint are expressed by coordinate values (X-axis coordinate value and Y-axis coordinate value) of an XY coordinate system that sets one vertex of the process target image 52 (original image) as the origin, the horizontal direction as the X-axis direction (first axial direction), and the vertical direction as the Y-axis direction (second axial direction). For example, the position coordinates of the start point or the end point are expressed by the coordinate values of the XY coordinate system that sets the top-left vertex of the process target image 52 (original image) as the origin, the rightward direction as the X-axis positive direction, and the downward direction as the Y-axis positive direction. Note that, the above-mentioned part 92 may include information indicating a thickness of the straight line 58A or other information.

The part 94 of the processing instruction information illustrated in FIG. 8 indicates the fact that an operation for putting the stamp has been performed and the attributes of the stamp. More specifically, it indicates that the stamp of the star mark 58B, which is red, has been drawn inside the process target image 52. Note that, "positionx" and "positiony" indicate the position coordinates of a representative point (for example, center point) of the star mark 58B. The position coordinates of the representative point of the star mark 58B are also expressed by the coordinate values of the above-mentioned XY coordinate system. Note that, the above-mentioned part 94 may include information indicating a size of the star mark 58B or other information.

Note that, the processing instruction information has an data amount extremely smaller in size than that of the processed process target image 52.

Further, the data processing system 1 includes an original data acquisition information receiving section 80, a processing instruction information receiving section 82, an original data acquisition section 84, a processed data generation section 86, and a processed data saving section 88. Those functional blocks are implemented by the second data management device 30. That is, the control unit 31 of the second data management device 30 executes the processing in accordance with the program, to thereby cause the control unit 31 to function as those functional blocks. Those functional blocks are described below.

The original data acquisition information receiving section 80 is described. The original data acquisition information receiving section 80 receives the original data acquisition information transmitted by the user device 10 (original data acquisition information transmitting section 74).

The processing instruction information receiving section 82 is described. The processing instruction information receiving section 82 receives the processing instruction information transmitted by the user device 10 (processing instruction information transmitting section 76).

The original data acquisition section 84 is described. The original data acquisition section 84 acquires the original data from the first database 22 (first data management system 2) based on the original data acquisition information received by the original data acquisition information receiving section 80.

As described above, the "original data acquisition information" represents, for example, the link information on (URL of) the original data, and the original data acquisition section 84 acquires the original data based on the link information on the original data. For example, in the example illustrated in FIG. 3 to FIG. 6, the original data acquisition section 84 downloads the original image from the first database 22 (first data management system 2) based on the link information on the original image.

The processed data generation section 86 is described. The processed data generation section 86 generates the processed data by processing the original data acquired by the original data acquisition section 84 based on the processing instruction information received by the processing instruction information receiving section 82.

For example, in the example illustrated in FIG. 3 to FIG. 6, the processed data generation section 86 processes the original image based on the processing instruction information, to thereby generate the same image (processed image) as the process target image 52 of when the process is completed on the processing screen 50.

The processed data saving section 88 is described. The processed data saving section 88 saves the processed data to the second database 35 (storage device different from the first database 22).

For example, in the example illustrated in FIG. 3 to FIG. 6, the processed data saving section 88 saves the processed image generated by the processed data generation section 86 to the second database 35.

Figure 9:
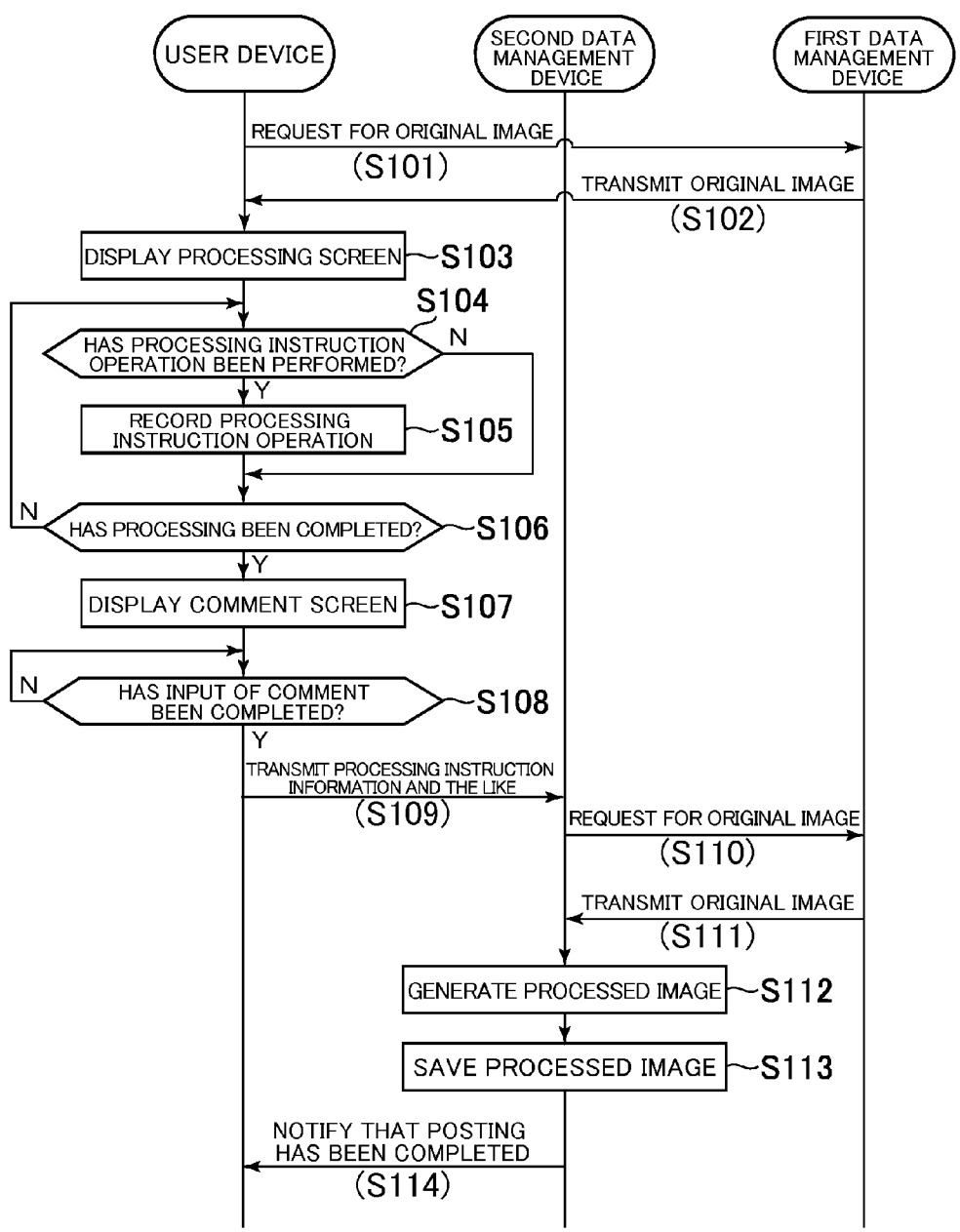
FIG. 9 is a flowchart illustrating an example of processing executed in a data processing system according to a first embodiment of the present invention.

Next, a description is made of processing executed by the data processing system 1 in order to implement the functional blocks described above. FIG. 9 is a diagram for illustrating an example of processing executed in the data processing system 1. Note that, here, a description is made of the processing executed by the data processing system 1 when any one of the thumbnail images 42 displayed on the selection screen 40 is selected. The control unit 11 of the user device 10 and the control unit 31 of the second data management device 30 execute the processing illustrated in FIG. 9 in accordance with the program, to thereby cause the control unit 11 and the control unit 31 to function as the functional blocks illustrated in FIG. 7.

When any one of the thumbnail images 42 displayed on the selection screen 40 is selected, as illustrated in FIG. 9, the control unit 11 of the user device 10 first requests the first data management device 20 for the original image corresponding to the selected thumbnail image 42 based on the link information associated with the thumbnail image 42 (S101). When the first data management device 20 receives the request, the first data management device 20 acquires the original image from the first database 22, and transmits the original image to the user device 10 (S102).

When the original image is received by the user device 10, the control unit 11 displays the processing screen 50 on the display unit 14 (S103). The original image received from the first data management device 20 is displayed on the processing screen 50 as the process target image 52.

While the processing screen 50 is displayed, the control unit 11 monitors whether or not the processing instruction operation has been performed by the user (S104). When the processing instruction operation has been performed by the user, the control unit 11 updates the process target image 52 displayed on the processing screen 50 based on the content of the processing instruction operation. In addition, the control unit 11 records the content of the processing instruction operation into the storage unit 12 (S105). For example, the history of the processing instruction operation is recorded in such a format as illustrated in FIG. 8. That is, first, the link information on the original image is recorded (see part 90 of FIG. 8). After that, each time the processing instruction operation is performed, the information indicating the content of the processing instruction operation is additionally recorded. For example, when the blue straight line 58A as illustrated in FIG. 5 is drawn, the information indicating that effect is additionally recorded (see part 92 of FIG. 8). In addition, after that, for example, when the stamp of the red star mark 58B illustrated in FIG. 5 is put, the information indicating that effect is additionally recorded (see part 94 of FIG. 8).

Further, while the processing screen 50 is displayed, the control unit 11 monitors whether or not the process has been completed (S106). That is, the control unit 11 monitors whether or not a completion operation has been performed by the user. In other words, the control unit 11 monitors whether or not the complete button 56A of the processing screen 50 has been pressed. Until the process has been completed, the control unit 11 repeatedly executes the processing of Steps S104 to S106.

When the process is completed, the control unit 11 displays the comment screen 60 on the display unit 14 (S107). While the comment screen 60 is displayed, the control unit 11 executes processing for displaying the comment 62, which the user has input using the software keyboard 64, on the comment screen 60.

Further, while the comment screen 60 is displayed, the control unit 11 monitors whether or not the input of the comment has been completed (S108). That is, the control unit 11 monitors whether or not the completion operation has been performed by the user. In other words, the control unit 11 monitors whether or not the post button 66A of the comment screen 60 has been pressed.

When the input of the comment is completed, the control unit 11 transmits ID information on the user, the link information on the original image (original data acquisition information), the processing instruction information, and the comment information to the second data management device 30 (S109). Here, the ID information on the user is identification information for uniquely identifying each user that uses the service provided by the second data management system 3. Further, the comment information is information indicating the comment 62 input on the comment screen 60.

When those pieces of information are received by the second data management device 30, the control unit 31 of the second data management device 30 requests the first data management device 20 for the original image based on the link information on the original image received in Step S109 (S110). When the first data management device 20 receives the request, the first data management device 20 acquires the original image from the first database 22, and transmits the original image to the second data management device (S111).

When the original image is received by the second data management device 30, the control unit 31 processes the original image based on the processing instruction information received in Step S109, to thereby generate the processed image (S112). In this Step S112, the same image as the process target image 52 of when the process has been completed on the processing screen 50 is generated as the processed image.

When the processing of Step S112 is completed, the control unit 31 saves the processed image generated in Step S112 and the comment information received in Step S109 in the second database 35 associating them with the ID information on the user received in Step S109 (S113).

For example, the control unit 31 saves the processed image generated in Step S112 in the second database 35. Further, the control unit 31 registers information relating to the processed image generated in Step S112 in an image table. FIG. 10 shows an example of the image table stored in the second database 35. The image table shown in FIG. 10 includes fields of "image ID", "user ID", "image", "comment", and "posted date/time".

In the "image ID" field, identification information for uniquely identifying the image saved to the second database 35 is registered. When the image is saved to the second database 35, an image ID is generated, and the image ID is registered in the "image ID" field. In the "user ID" field, the ID information on the user who has posted the image is registered. That is, the ID information on the user received in Step S109 is registered in the "user ID" field. In the "image" field, the link information on the processed image generated in Step S112, that is, the information indicating a location in which the processed image is saved is registered. In the "comment" field, the comment information received in Step S109 is registered. In the "posted date/time" field, a date/time at which the image and the comment are posted is registered.

When the processing of Step S113 is completed, the control unit 31 transmits notification information for notifying that the registration of the processed image has been completed to the user device 10 (S114). In this case, on the user device 10, a message indicating that the registration of the processed image has been completed is displayed on the display unit 14, and after that, for example, the selection screen 40 is displayed on the display unit 14. Now, the description of the processing illustrated in FIG. 9, which has been made so far, is brought to an end.

According to the data processing system 1 of the first embodiment described above, without transmitting the processed data (such as still image, moving image, or sound) itself from the user device 10 to the second data management system 3, the processed data is registered in the second data management system 3. That is, in the data processing system 1, instead of transmitting the processed data itself from the user device 10 to the second data management system 3, the processing instruction information as illustrated in FIG. 8 having a data amount smaller in size than that of the processed data itself is transmitted from the user device 10 to the second data management system 3. As a result, according to the data processing system 1, it is possible to alleviate the communication load relating to the data transmission from the user device 10 to the second data management system 3.

[Second Embodiment] The second embodiment of the present invention is described. The overall configuration of the data processing system 1 according to the second embodiment of the present invention is the same as that of the first embodiment. Further, a screen displayed on the user device 10 according to the second embodiment is also the same as that of the first embodiment, and the functional blocks implemented by the data processing system 1 according to the second embodiment are also the same as those of the first embodiment.

In the data processing system 1 according to the first embodiment, when the processing for the original data is completed on the user device 10, the processing instruction information indicating the content of the processing instruction operation performed by the user is transmitted from the user device 10 to the second data management device 30 along with the original data acquisition information. However, in the data processing system 1 according to the second embodiment, before the processing for the original data is completed on the user device 10, the original data acquisition information and the processing instruction information are transmitted to the second data management device 30.

Figure 11:
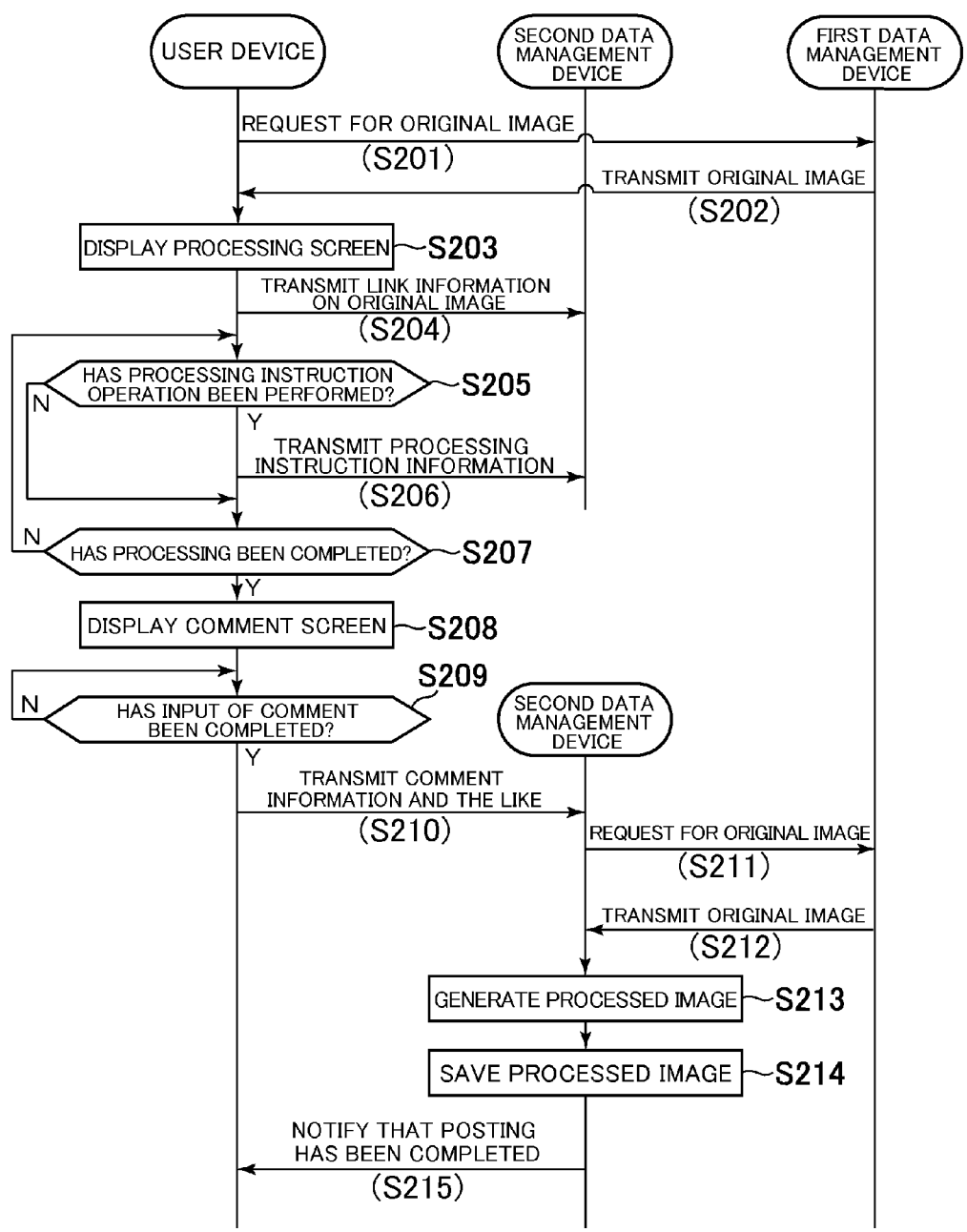
FIG. 11 is a flowchart illustrating an example of processing executed in a data processing system according to a second embodiment of the present invention.

In the data processing system 1 according to the second embodiment, processing illustrated in FIG. 11 is executed in place of the processing illustrated in FIG. 9. Now, a description is made of the processing illustrated in FIG. 11.

The processing of Steps S201 to S203 of FIG. 11 is the same as the processing of Steps S101 to S103 of FIG. 9.

When the processing screen 50 is displayed on the display unit 14 in Step S203, the control unit 11 transmits the ID information on the user and the link information on the original image (see part 90 of FIG. 8; original data acquisition information) to the second data management device 30 (S204). In this case, on the second data management device 30, the link information on the original image is saved to the storage unit 32 (or second database 35) in association with the ID information on the user. This information is referred to when the processing for the original image is executed (Step S211 described later).

While the processing screen 50 is displayed, the control unit 11 monitors whether or not the processing instruction operation has been performed by the user(S205). When the processing instruction operation has been performed by the user, the control unit 11 updates the process target image 52 displayed on the processing screen 50 based on the content of the processing instruction operation. In addition, the control unit 11 transmits the processing instruction information indicating the content of the processing instruction operation to the second data management device 30 along with the ID information on the user (S206). That is, each time the processing instruction operation is performed, the control unit 11 transmits the processing instruction information indicating the content of the processing instruction operation to the second data management device 30 along with the ID information on the user.

For example, when the blue straight line 58A as illustrated in FIG. 5 is drawn, the control unit 11 transmits the processing instruction information (see part 92 of FIG. 8) indicating that effect to the second data management device 30 along with the ID information on the user. In addition, after that, for example, when the stamp of the red star mark 58B as illustrated in FIG. 5 is put, the control unit 11 transmits the processing instruction information (see part 94 of FIG. 8) indicating that effect to the second data management device 30 along with the ID information on the user.

In this case, on the second data management device 30, the processing instruction information is saved to the storage unit 32 (or second database 35) in association with the ID information on the user. As a result, for example, the processing instruction information as illustrated in FIG. 8 is saved in association with the ID information on the user. This information is referred to when the processing for the original image is executed (Step S213 described later).

Further, while the processing screen 50 is displayed, the control unit 11 monitors whether or not the process has been completed (S207). The processing of Step S207 is the same as the processing of Step S106 of FIG. 9.

When the process is completed, the control unit 11 displays the comment screen 60 on the display unit 14 (S208). While the comment screen 60 is displayed, the control unit 11 monitors whether or not the input of the comment has been completed (S209). The processing of Steps S208 and S209 is the same as the processing of Steps S107 and S108 of FIG. 12. When the input of the comment is completed, the control unit 11 transmits the comment information to the second data management device 30 along with the ID information on the user (S210). The transmission of the comment information also plays the role of notifying the second data management device 30 that the processing with respect to the process target image has been completed.

When those pieces of information are received by the second data management device 30, the control unit 31 of the second data management device 30 requests the first data management device 20 for the original image based on the link information on the original image received in Step S204 (S211). As described above, the link information on the original image received in Step S204 is stored in the storage unit 32 (or second database 35) in association with the ID information on the user, and hence the control unit 31 requests the first data management device 20 for the original image based on the link information on the original image stored in association with the ID information on the user received in Step S210. When this request is received by the first data management device 20, the first data management device 20 acquires the original image from the first database 22, and transmits the original image to the second data management device 30 (S212).

When the original image is received by the second data management device 30, the control unit 31 generates the processed image by processing the original image based on the processing instruction information stored in association with the ID information on the user received in Step S210 (S213). In this Step S213, the same image as the process target image 52 of when the process has been completed on the processing screen 50 is generated as the processed image.

When the processing of Step S213 is completed, the control unit 31 saves the processed image generated in Step S213 and the comment information received in Step S210 to the second database 35 in association with the ID information on the user received in Step S210 (S214). Further, when the processing of Step S214 is completed, the control unit 31 transmits the notification information for notifying that the registration of the processed image has been completed to the user device 10 (S215). The processing of Steps S214 and S215 are the same as the processing of Steps S113 and S114 of FIG. 9.

Note that, in the processing illustrated in FIG. 11, each time the processing instruction operation is performed, the processing instruction information is transmitted to the second data management device 30. However, for example, each time the number of processing instruction operations performed by the user reaches a predetermined number, the processing instruction information indicating the contents of those predetermined number of processing instruction operations may be transmitted to the second data management device 30. Alternatively, each time a predetermined time period has elapsed, the processing instruction information indicating the contents of the processing instruction operations performed within a predetermined time period may be transmitted to the second data management device 30.

Further, in the processing illustrated in FIG. 11, immediately after the processing screen 50 is displayed, the link information on the original image is transmitted to the second data management device 30. However, before the processing screen 50 is displayed, the link information on the original image may be transmitted to the second data management device 30. Alternatively, when the first piece of processing instruction information is transmitted to the second data management device 30, the link information on the original image may be transmitted to the second data management device 30.

[Third Embodiment] The third embodiment of the present invention is described. The overall configuration of the data processing system 1 according to the third embodiment of the present invention is the same as that of the first and second embodiments. Further, a screen displayed on the user device 10 according to the third embodiment is also the same as that of the first and second embodiments, and the functional blocks implemented by the data processing system 1 according to the third embodiment are also the same as those of the first and second embodiments.

In the data processing system 1 according to the second embodiment, after the processing with respect to the original data has been completed on the user device 10, generation of the processed data is started on the second data management device 30. However, in the data processing system 1 according to the third embodiment, before the processing for the original data has been completed on the user device 10, the generation of the processed data is started on the second data management device 30.

Figure 12:
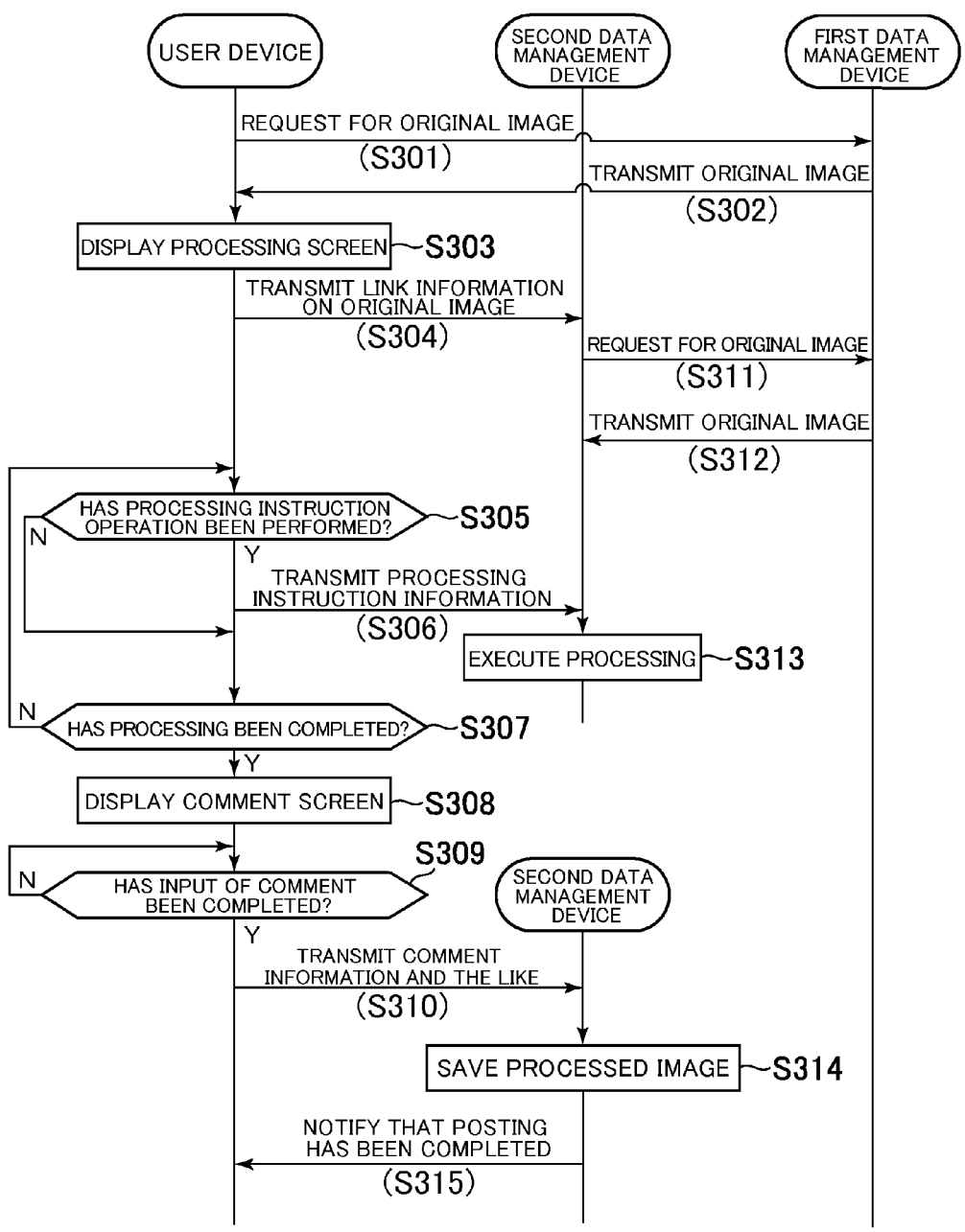
FIG. 12 is a flowchart illustrating an example of processing executed in a data processing system according to a third embodiment of the present invention.

In the data processing system 1 according to the third embodiment, the processing illustrated in FIG. 12 is executed in place of the processing illustrated in FIG. 11. Now, a description is made of the processing illustrated in FIG. 12.

The processing of Steps S301 to S310 of FIG. 12 is the same as the processing of Steps S201 to S210 of FIG. 11.

In the processing illustrated in FIG. 12, when the ID information on the user and the link information on the original image (see part 90 of FIG. 8; original data acquisition information) are transmitted to the second data management device 30 in Step S304, the control unit 31 of the second data management device 30 requests the first data management device 20 for the original image based on the link information on the original image received in Step S304 (S311). When this request is received by the first data management device 20, the first data management device 20 acquires the original image from the first database 22, and transmits the original image to the second data management device 30 (S312). In this case, on the second data management device 30, the original image is stored as the process target image into the storage unit 32 (or second database 35) in association with the ID information on the user received in Step S304.

Further, in the processing illustrated in FIG. 12, each time the ID information on the user and the processing instruction information are received by the second data management device 30 in Step S306, the control unit 31 of the second data management device 30 processes the process target image stored in association with the ID information on the user received in Step S306 based on the processing instruction information received in Step S306 (S313).

For example, when the blue straight line 58A is drawn inside the process target image 52 on the processing screen 50, in Step S306, the processing instruction information (see part 92 of FIG. 8) indicating that effect is transmitted to the second data management device 30 along with the ID information on the user. In this case, in Step S313, a blue straight line is drawn inside the process target image stored in association with the ID information on the user.

In addition, after that, for example, when the stamp of the red star mark 58B is put inside the process target image 52 on the processing screen 50, in Step S306, the processing instruction information (see part 94 of FIG. 8) indicating that effect is transmitted to the second data management device 30 along with the ID information on the user. In this case, in Step S313, the stamp of a red star mark is put inside the process target image stored in association with the ID information on the user.

Further, in the processing illustrated in FIG. 12, when the ID information on the user and the comment information are received by the second data management device 30 in Step S310, the control unit 31 of the second data management device 30 saves the process target image stored in association with the ID information on the user, to the second database 35 as the processed image (image that has been processed) (S314). Further, when the processing of Step S314 is completed, the control unit 31 transmits the notification information for notifying that the registration of the processed image has been completed to the user device 10 (S315). The processing of these Steps S314 and S315 is the same as the processing of Steps S214 and S215 of FIG. 9. The description of the processing illustrated in FIG. 12, which has been made so far, is brought to an end.

Note that, in the processing illustrated in FIG. 12, each time the processing instruction operation is performed, the processing instruction information is transmitted to the second data management device 30. However, for example, each time the number of processing instruction operations performed by the user reaches a predetermined number, the processing instruction information indicating the contents of those predetermined number of processing instruction operations may be transmitted to the second data management device 30. Alternatively, each time a predetermined time period has elapsed, the processing instruction information indicating the contents of the processing instruction operations performed within a predetermined time period may be transmitted to the second data management device 30.

Further, in the processing illustrated in FIG. 12, immediately after the processing screen 50 is displayed, the link information on the original image is transmitted to the second data management device 30. However, before the processing screen 50 is displayed, the link information on the original image may be transmitted to the second data management device 30. Alternatively, when the first piece of processing instruction information is transmitted to the second data management device 30, the link information on the original image may be transmitted to the second data management device 30.

With the data processing system 1 according to the third embodiment described above, before the processing for the process target image has been completed on the user device 10, the generation of the processed image is started on the second data management device 30, and hence it is possible to reduce a time period after the processing for the process target image is completed on the user device 10 and before the registration (posting) of the processed image is completed. That is, it is possible to reduce the time period for which the user waits until the registration of the processed image is completed.

[Fourth Embodiment] The fourth embodiment of the present invention is described. The overall configuration of the data processing system 1 according to the fourth embodiment of the present invention is the same as that of the first to third embodiments. Further, a screen displayed on the user device 10 according to the fourth embodiment is also the same as that of the first to third embodiments, and the functional blocks implemented by the data processing system 1 according to the fourth embodiment are also the same as those of the first to third embodiments.

In the data processing system 1 according to the fourth embodiment, when any one of the thumbnail images 42 displayed on the selection screen 40 is selected, an alternative image generated based on the original image of the thumbnail image 42 is displayed on the processing screen 50 as the process target image 52 in place of the original image.

Here, the "alternative image" represents, for example, an image generated based on the original image to be used in place of the original image, and the image having a data amount smaller in size than that of the original image. For example, the "alternative image" represents a reduced image obtained by reducing the original image in size, an image obtained by reducing the number of colors of the original image, or the like.

The following description is directed to a case where the reduced image obtained by reducing the original image in size is displayed on the processing screen 50 as the process target image 52. In this case, on the selection screen 40, the link information on (URL of) the reduced image is associated with each of the thumbnail images 42. Further, when any one of the thumbnail images 42 displayed on the selection screen 40 is selected, the reduced image is downloaded from the first data management system 2 onto the user device 10 based on the link information associated with the thumbnail image 42. Then, the reduced image is displayed on the processing screen 50 as the process target image 52. In this case, the user applies processing to the reduced image.

Further, when the post button 66A is pressed on the comment screen 60, the processing instruction information indicating the content of the processing instruction operation performed for the reduced image is transmitted to the second data management device 30. Then, the original image is acquired from the first data management system 2 on the second data management device 30, and the original image is processed based on the content of the processing instruction operation performed for the reduced image, to thereby generate the processed image. In this case, the processed image is generated based on the content of the processing instruction operation performed for the reduced image and a ratio of a size between the reduced image and the original image. Details thereof are described later.

In the data processing system 1 according to the fourth embodiment, the reduced image having a data amount smaller in size than that of the original image is downloaded from the first data management system 2 onto the user device 10, and hence it is possible to alleviate the communication load relating to the data transmission from the first data management system 2 to the user device 10.

Now, a description is made of each of the functional blocks according to the fourth embodiment. First, the data receiving section 70 is described. The data receiving section 70 receives alternative data with regard to the original data generated based on the original data through the communication network 4. Here, the "alternative data" represents, for example, data generated based on the original data to be used in place of the original data. For example, the "alternative data" is the data generated based on the original data to be used in place of the original data, and is the data having a data amount smaller in size than that of the original data.

For example, when the original data is data of the still image, the "alternative data" corresponds to data of a reduced image obtained by reducing an original still image in size, an image obtained by reducing the number of colors of the original still image, or the like. Further, for example, when the original data is data of a moving image or a sound, the "alternative data" corresponds to the data of the moving image or the sound made to have the smaller data amount by degrading image quality or sound quality of an original moving image or an original sound.

The processing instruction receiving section 72 is described. The processing instruction receiving section 72 receives the processing instruction operation for the alternative data received by the data receiving section 70.

The original data acquisition information transmitting section 74 is described. The original data acquisition information transmitting section 74 transmits the original data acquisition information for acquiring the original data from the first database 22 (first data management system 2) to the second data management device 30.

For example, the original data acquisition information transmitting section 74 transmits the link information (identification information) on the original data as the "original data acquisition information".

Note that, it is necessary to acquire the link information on the original data image in order to transmit the link information on the original data as the "original data acquisition information". Now, a description is made of a mechanism for acquiring the link information on the original data. The following description is made by taking an exemplary case of acquiring the link information on the original image in a mode in which the reduced image obtained by reducing the original image in size is displayed on the processing screen 50 as the process target image 52.

As the first example of the mechanism for acquiring the link information on the original image, it is conceivable to associate the link information on the original image with each of the thumbnail images 42 displayed on the selection screen 40 along with the link information on the reduced image. In this case, a correspondence relationship between the link information on the reduced image and the link information on the original image is held on the selection screen 40.

As the second example of the mechanism for acquiring the link information on the original image, it is conceivable to set the link information on the reduced image by having the link information on the original image and the link information on the reduced image have a fixed relationship. For example, when the link information on (URL of) the original image is "http://www.xxx.com/yyy/zzz.jpg", it is conceivable to set the link information on (URL of) the reduced image by adding a predetermined character string (_s) to a predetermined position of the link information on (URL of) the original image such as "http://www.xxx.com/yyy/zzz_s.jpg". With such a setting, the link information on the original image can be acquired from the link information on the reduced image.

As the third example of the mechanism for acquiring the link information on the original image, it is conceivable to store the information indicating the correspondence relationship between the link information on the reduced image and the link information on the original image in the first data management system 2 (first database 22). With such a configuration, it is possible to acquire the link information on the original image from the link information on the reduced image by querying the first data management system 2.

The example of the mechanism for acquiring the link information on the original image is not limited to the above-mentioned examples. Another mechanism may be employed.

Incidentally, the original data acquisition information transmitting section 74 may transmit the link information (identification information) on the alternative data as the "original data acquisition information".

However, in this case, on the second data management device 30 side, it is necessary to acquire the link information on the original data based on the link information on the alternative data. That is, the original data acquisition section 84 acquires the original data based on the link information on the alternative data, which necessitates a mechanism for acquiring the link information on the original data based on the link information on the alternative data. As the mechanism for acquiring the link information on the original data based on the link information on the alternative data, for example, it is possible to employ the above-mentioned mechanisms (second example and third example).

The processing instruction information transmitting section is described. The processing instruction information transmitting section 76 transmits the processing instruction information relating to the content of the processing instruction operation performed for the alternative data to the second data management device 30.

The original data acquisition information receiving section 80, the processing instruction information receiving section 82, and the original data acquisition section 84 are described. The original data acquisition information receiving section 80 and the processing instruction information receiving section 82 are the same as those of the first embodiment. The original data acquisition section 84 is also basically the same as that of the first embodiment. However, as described above, when the link information on the alternative data is transmitted from the user device 10 to the second data management device 30 as the "original data acquisition information", the original data acquisition section 84 needs to acquire the link information on the original data based on the link information on the alternative data.

The processed data generation section 86 and the processed data saving section 88 are described. The processed data generation section 86 generates the processed data by processing the original data acquired by the original data acquisition section 84 based on the processing instruction information received by the processing instruction information receiving section 82 (that is, content of the processing instruction operation performed for the alternative data). The processed data saving section 88 is the same as that of the first embodiment.

Here, a description is made of processing executed by the data processing system 1 according to the fourth embodiment. In the data processing system 1 according to the fourth embodiment, processing illustrated in FIG. 13 is executed in place of the processing illustrated in FIG. 9.

Figure 13:
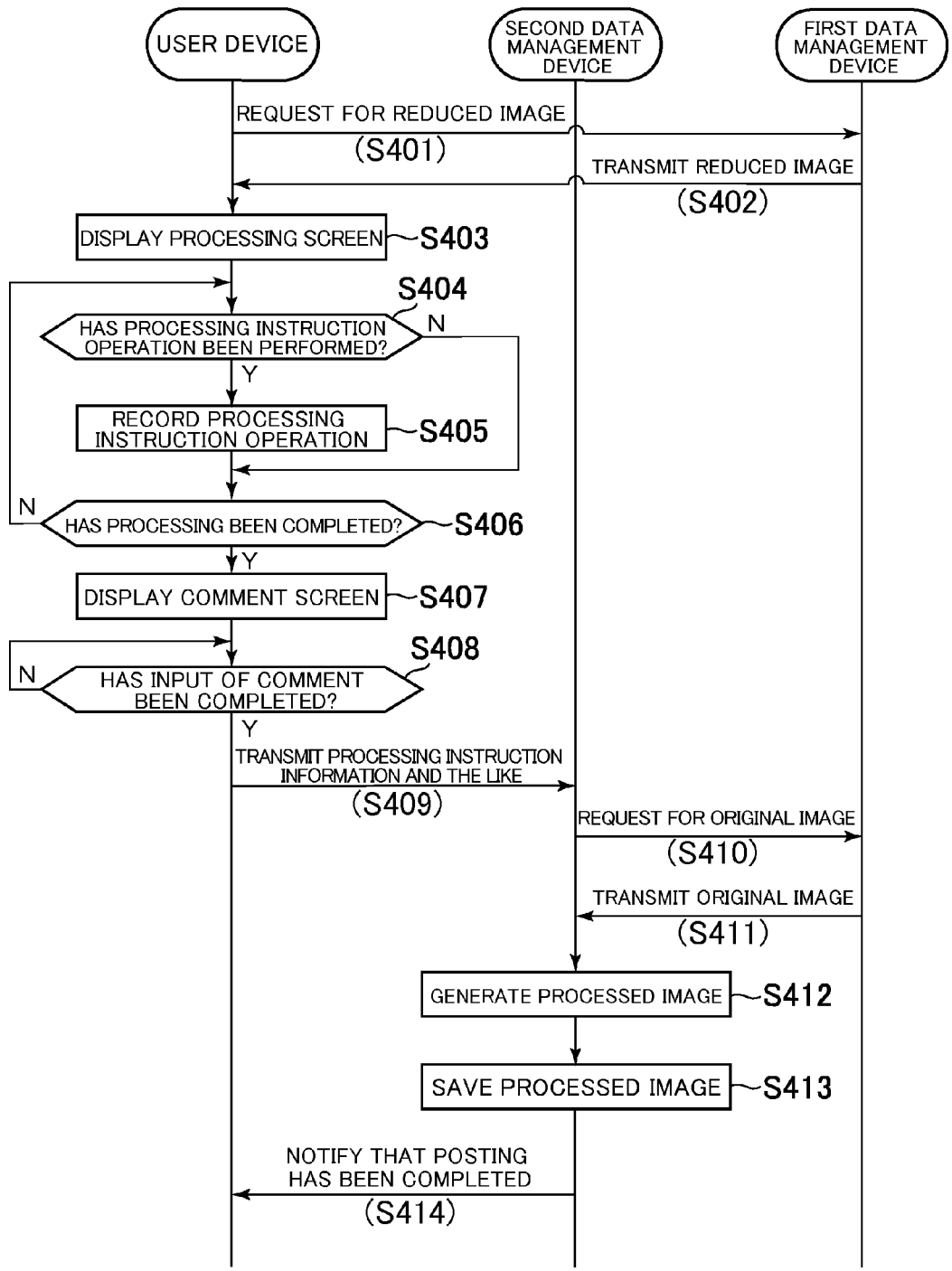
FIG. 13 is a flowchart illustrating an example of processing executed in a data processing system according to a fourth embodiment of the present invention.

In the data processing system 1 according to the fourth embodiment, when any one of the thumbnail images 42 displayed on the selection screen 40 is selected, as illustrated in FIG. 13, first, the control unit 11 of the user device 10 requests the first data management device 20 for the reduced image of the original image corresponding to the thumbnail image 42 based on the link information associated with the selected thumbnail image 42 (S401). When this request is received by the first data management device 20, the first data management device 20 acquires the reduced image, and transmits the reduced image to the user device 10 (S402). Note that, the reduced image may be stored in the first database 22 in advance, or may be generated based on the original image at this point in time.

When the reduced image is received by the user device 10, the control unit 11 displays the processing screen 50 on the display unit 14 (S403). On the processing screen 50, the reduced image received from the first data management device 20 is displayed as the process target image 52.

While the processing screen 50 is displayed, it is monitored whether or not the processing instruction operation has been performed by the user (S404). When the processing instruction operation is performed by the user, the control unit 11 updates the process target image 52 based on the content of the processing instruction operation, and records the content of the processing instruction operation into the storage unit 12 (S405). For example, the history of the processing instruction operation is recorded in such a format as illustrated in FIG. 8.

Note that, in this case, the control unit 11 records positional information indicating the position relating to the processing performed with respect to the reduced image by the X-axis coordinate value and the Y-axis coordinate value within the reduced image. Here, the wording "the X-axis coordinate value and the Y-axis coordinate value within the reduced image" represents, for example, the coordinate values in the XY coordinate system that sets the top-left vertex of the reduced image as the origin, the rightward direction as the X-axis positive direction (first axial direction), and the downward direction as the Y-axis positive direction (second axial direction).

For example, when processing for adding the straight line 58A and the star mark 58B as illustrated in FIG. 5 to the reduced image is performed, the control unit 11 records the X-axis coordinate values and the Y-axis coordinate values of the start point and the end point of the straight line 58A within the reduced image and the X-axis coordinate value and the Y-axis coordinate value of the representative point of the star mark 58B within the reduced image. In this manner, when the processing for adding an object to the reduced image is performed, the control unit 11 records the X-axis coordinate value and the Y-axis coordinate value of the object within the reduced image.

Further, while the processing screen 50 is displayed, the control unit 11 monitors whether or not the process has been completed (S406). When the process is completed, the control unit 11 displays the comment screen 60 on the display unit 14 (S407). While the comment screen 60 is displayed, the control unit 11 executes the processing for displaying the comment 62, which has been input by the user using the software keyboard 64, on the comment screen 60.

Further, while the comment screen 60 is displayed, the control unit 11 monitors whether or not the input of the comment has been completed (S408). If the input of the comment has been completed, the control unit 11 transmits the ID information on the user, the link information on the original image (original data acquisition information), the processing instruction information, and the comment information to the second data management device 30 (S409).

The processing instruction information in this case includes the positional information indicating the position relating to the processing performed with respect to the reduced image by the X-axis coordinate value and the Y-axis coordinate value within the reduced image. For example, when the processing for adding the straight line 58A and the star mark 58B as illustrated in FIG. 5 to the reduced image is performed, the processing instruction information includes the X-axis coordinate values and the Y-axis coordinate values of the start point and the end point of the straight line 58A within the reduced image and the X-axis coordinate value and the Y-axis coordinate value of the representative point of the star mark 58B within the reduced image.

Note that, as described above, in Step S409, the link information on the reduced image may be transmitted in place of the link information on the original image.

When the information transmitted in Step S409 is received by the second data management device 30, the control unit 31 of the second data management device 30 requests the first data management device 20 for the original image based on the link information on the original image received in Step S409 (S410). When the request is received by the first data management device 20, the first data management device 20 acquires the original image from the first database 22, and transmits the original image to the second data management device 30 (S411).

When the original image is received by the second data management device 30, the control unit 31 generates the processed image by processing the original image based on the processing instruction information received in Step S409 (S412). In this Step S412, the original image is processed based on the content of the processing instruction operation performed for the reduced image on the processing screen 50.

In Step S412, for example, the positional information relating to the processing to be performed with respect to the original image is acquired based on the positional information included in the processing instruction information. For example, when the processing for adding the object to the reduced image is performed, the control unit 31 acquires the X-axis coordinate value and the Y-axis coordinate value of the object within the original image based on the X-axis coordinate value and the Y-axis coordinate value of the object within the reduced image. The X-axis coordinate value and the Y-axis coordinate value of the object within the original image are acquired using the following Expressions (1) and (2).

$$xa = xb*(Wa/Wb) \quad (1)$$

$$ya = yb*(Ha/Hb) \quad (2)$$

Note that, in the above-mentioned Expression (1), "xa" represents the X-axis coordinate value within the original image, and "xb" represents the X-axis coordinate value within the reduced image. Further, "Wa" represents the width (length in the X-axis direction) of the original image, and "Wb" represents the width (length in the X-axis direction) of the reduced image. In the above-mentioned Expression (1), the X-axis coordinate value (xa) within the original image is calculated based on the X-axis coordinate value (xb) within the reduced image and the ratio (Wa/Wb) of length in the X-axis direction between the reduced image and the original image.

In the same manner, in the above-mentioned Expression (2), "ya" represents the Y-axis coordinate value within the original image, and "yb" represents the Y-axis coordinate value within the reduced image. Further, "Ha" represents the height (length in the Y-axis direction) of the original image, and "Hb" represents the height (length in the Y-axis direction) of the reduced image. In the above-mentioned Expression (2), the Y-axis coordinate value (ya) within the original image is calculated based on the Y-axis coordinate value (yb) within the reduced image and the ratio (Ha/Hb) of the length in the Y-axis direction between the reduced image and the original image.

For example, on the assumption that the processing instruction information illustrated in FIG. 8 indicates the content of the processing instruction operation performed for the reduced image, the position coordinates of the start point and the end point of the straight line 58A within the original image are acquired in accordance with the above-mentioned Expressions (1) and (2). Further, the position coordinates of the representative point of the stamp of the star mark 58B within the original image are also acquired in accordance with the above-mentioned Expressions (1) and (2). Note that, the size of the stamp of the star mark 58B may also be enlarged based on (Wa/Wb) within the above-mentioned Expression (1) and (Ha/Hb) within the above-mentioned Expression (2).

Incidentally, in Step S412, the ratio (Wa/Wb) of the length in the X-axis direction between the reduced image and the original image and the ratio (Ha/Hb) of the length in the Y-axis direction between the reduced image and the original image are necessary. Now, descriptions are made of examples of a mechanism for acquiring the above-mentioned ratios.

As the first example, it is conceivable that the control unit 31 queries to the first data management system 2 to thereby acquire the lengths (Wb and Hb) in the X-axis direction and the Y-axis direction of the reduced image are acquired. In this case, the control unit 31 can calculate the above-mentioned ratios based on the lengths (Wb and Hb) in the X-axis direction and the Y-axis direction of the reduced image acquired as described above and the lengths (Wa and Ha) in the X-axis direction and the Y-axis direction of the original image acquired in Step S411.

Note that, in Step S409 and so on, the control unit 11 of the user device 10 may transmit the information indicating the lengths (Wb and Hb) in the X-axis direction and the Y-axis direction of the reduced image to the second data management device 30. With this configuration as well, the control unit 31 can calculate the above-mentioned ratios.

As the second example, it is conceivable to store the information indicating the above-mentioned ratios in the first data management system 2 (first database 22) in advance. In this case, the control unit 31 can acquire the above-mentioned ratios by querying the first data management system 2.

Note that, the control unit 11 of the user device 10 may acquire the above-mentioned ratios by querying the first data management system 2, and in Step S409 and so on, may transmit the information indicating the above-mentioned ratios to the second data management device 30. With this configuration as well, the control unit 31 can acquire the above-mentioned ratios.

As the third example, it is conceivable to fix the above-mentioned ratios to constant values and store the information indicating the above-mentioned ratios in the second data management device 30 in advance. Note that, the information indicating the above-mentioned ratios may be stored in the user device 10 in advance. Then, in Step S409 and so on, the control unit 11 of the user device 10 may transmit the information indicating the above-mentioned ratios to the second data management device 30. With this configuration as well, the control unit 31 can acquire the above-mentioned ratios.

When the processing of Step S412 is completed, the control unit 31 saves the processed image generated in Step S412 and the comment information received in Step S409 to the second database 35, associating them with the ID information on the user received in Step S409 (S413). Further, when the processing of Step S413 is completed, the control unit 31 transmits the notification information for notifying that the registration of the processed image has been completed to the user device 10 (S414). The processing of those Steps S413 and S414 is the same as the processing of Steps S113 and S114 of FIG. 9. The description of the processing illustrated in FIG. 13, which has been made so far, is brought to an end.

Note that, the processing executed by the data processing system 1 according to the fourth embodiment is not limited to the example illustrated in FIG. 13. Now, descriptions are made of two examples, as to other examples of the processing executed by the data processing system 1 according to the fourth embodiment.

To begin with, the first example is described. For example, in Step S405, the control unit 11 may record an X-axis normalized coordinate value (first normalized coordinate value) and a Y-axis normalized coordinate value (second normalized coordinate value) of the position relating to the processing performed with respect to the reduced image. Here, the "X-axis normalized coordinate value" is a coordinate value obtained by dividing the X-axis coordinate value ($xb$: see the above-mentioned Expression (1)) within the reduced image by the length ($Wb$: see the above-mentioned Expression (1)) in the X-axis direction of the reduced image. In the same manner, the "Y-axis normalized coordinate value" is a coordinate value obtained by dividing the Y-axis coordinate value ($yb$: see the above-mentioned Expression (2)) within the reduced image by the length ($Hb$: see the above-mentioned Expression (2)) in the Y-axis direction of the reduced image. The "X-axis normalized coordinate value" and the "Y-axis normalized coordinate value" each assume a value equal to or larger than zero and equal to or smaller than one.

For example, when the processing for adding the straight line 58A and the star mark 58B as illustrated in FIG. 5 to the reduced image is performed, the control unit 11 records the X-axis normalized coordinate value and the Y-axis normalized coordinate value of the start point and the end point of the straight line 58A and the X-axis normalized coordinate value and the Y-axis normalized coordinate value of the representative point of the star mark 58B. In this case, the processing instruction information transmitted to the second data management device 30 in Step S409 includes the X-axis normalized coordinate value and the Y-axis normalized coordinate value of the start point and the end point of the straight line 58A and the X-axis normalized coordinate value and the Y-axis normalized coordinate value of the representative point of the star mark 58B.

Further, in Step S412, the control unit 31 acquires the information relating to the position for the processing to be performed with respect to the original image based on the positional information included in the processing instruction information. For example, when the processing for adding the object to the reduced image is performed, the control unit 31 acquires the X-axis coordinate value and the Y-axis coordinate value of the object within the original image based on the X-axis normalized coordinate value and the Y-axis normalized coordinate value of the object within the reduced image. The X-axis coordinate value and the Y-axis coordinate value within the original image are acquired by the following Expressions (3) and (4).

$$xa = xc * Wa \quad (3)$$

$$ya = yc * Ha \quad (4)$$

Note that, in the above-mentioned Expressions (3) and (4), "$xc$" and "$yc$" represent the X-axis normalized coordinate value and the Y-axis normalized coordinate value within the reduced image. Further, in the same manner as in the above-mentioned Expressions (1) and (2), "$xa$" and "$ya$" represent the X-axis coordinate value and the Y-axis coordinate value within the original image, respectively, and "$Wa$" and "$Ha$" represent the width (length in the X-axis direction) and the height (length in the Y-axis direction) of the original image, respectively.

With the above-mentioned configuration as well, the processed image can be generated by processing the original image based on the content of the processing instruction operation performed for the reduced image.

The second example is described. For example, in Step S405, the control unit 11 may acquire the position relating to the processing to be performed with respect to the original image based on the position relating to the processing performed with respect to the reduced image.

For example, when the processing for adding the straight line 58A and the star mark 58B as illustrated in FIG. 5 to the reduced image is performed, the control unit 11 acquires the X-axis coordinate value ($xa$: see the above-mentioned Expression (1)) of the start point of the straight line 58A within the original image based on the X-axis coordinate value ($xb$: see the above-mentioned Expression (1)) of the start point of the straight line 58A within the reduced image and the ratio ($Wa/Wb$: see the above-mentioned Expression (1)) of the length in the X-axis direction between the reduced image and the original image. In this case, the X-axis coordinate value of the start point of the straight line 58A within the original image is calculated in accordance with the above-mentioned Expression (1).

In the same manner, the control unit 11 acquires the Y-axis coordinate value ($ya$: see the above-mentioned Expression (2)) of the start point of the straight line 58A within the original image based on the Y-axis coordinate value ($yb$: see the above-mentioned Expression (2)) of the start point of the straight line 58A within the reduced image and the ratio ($Ha/Hb$: see the above-mentioned Expression (2)) of the length in the Y-axis direction between the reduced image and the original image. In this case, the Y-axis coordinate value is calculated in accordance with the above-mentioned Expression (2) of the start point of the straight line 58A within the original image.

Further, the control unit 11 acquires the X-axis coordinate value and the Y-axis coordinate value of the endpoint of the straight line 58A within the original image. In addition, the control unit 11 acquires the X-axis coordinate value and the Y-axis coordinate value of the representative point of the star mark 58B within the original image.

Note that, in this case, in Step S405, the ratio ($Wa/Wb$) of the length in the X-axis direction between the reduced image and the original image and the ratio ($Ha/Hb$) of the length in the Y-axis direction between the reduced image and the original image are necessary. Now, descriptions are made of examples of the mechanism for acquiring the above-mentioned ratios.

As the first example, it is conceivable that the control unit 11 refers to the first data management system 2 to thereby acquire the lengths ($Wa$ and $Ha$) in the X-axis direction and the Y-axis direction of the original image. In this case, the control unit 11 can calculate the above-mentioned ratios based on the lengths ($Wa$ and $Ha$) in the X-axis direction and the Y-axis direction of the original image acquired as described above and the lengths ($Wb$ and $Hb$) in the X-axis direction and the Y-axis direction of the reduced image acquired in Step S402.

As the second example, it is conceivable to store the information indicating the above-mentioned ratios in the first data management system 2 (first database 22) in advance. In this case, the control unit 11 can acquire the above-mentioned ratios by querying the first data management system 2.

As the third example, it is conceivable to fix the above-mentioned ratios to constant values and store the information indicating the above-mentioned ratios in the user device 10 in advance. With such a configuration as well, the control unit 11 can acquire the above-mentioned ratios.

Note that, when the above-mentioned processing is executed in Step S405, the processing instruction information transmitted to the second data management device 30 in Step S409 includes the X-axis coordinate values and the Y-axis coordinate values of the start point and the end point of the straight line 58A within the original image and the X-axis coordinate value and the Y-axis coordinate value of the representative point of the star mark 58B within the original image. Further, in Step S412, the control unit 31 acquires the position for the processing to be performed with respect to the original image from the positional information included in the processing instruction information.

With the above-mentioned configuration as well, the processed image can be generated by processing the original image based on the content of the processing instruction operation performed for the reduced image.

With the data processing system 1 according to the fourth embodiment described above, for example, the reduced image having a data amount smaller in size than that of the original image is downloaded from the first data management system 2 onto the user device 10, and hence it is possible to alleviate the communication load relating to the data transmission from the first data management system 2 to the user device 10.

Incidentally, the data processing system 1 according to the fourth embodiment described above can be combined with the configuration of the second embodiment or the third embodiment.

Note that, the present invention is not limited to the first to fourth embodiments described above.

(1) For example, in the processing illustrated in FIGS. 9 and 13, before the processing instruction information is transmitted to the second data management device 30, the control unit 11 may determine whether or not information on mutually contradictory processing instruction operations is included in the processing instruction information. Here, the "mutually contradictory processing instruction operations" represents a combination of a given processing instruction operation and an operation that cancels the given processing instruction operation. For example, when the user draws a line and then deletes the line, the operation for drawing the line and the operation for deleting the line correspond to the "mutually contradictory processing instruction operations".

When the information on the mutually contradictory processing instruction operations is included in the processing instruction information, the control unit 11 may delete the information on those processing instruction operations from the processing instruction information. With such a configuration, it is possible to further alleviate the data amount of the processing instruction information transmitted from the user device 10 to the second data management device 30, and it is possible to alleviate the communication load relating to the data transmission from the user device 10 to the second data management device 30.

Further, for example, in the processing illustrated in FIG. 11, before the processing (S213) for processing the original image based on the processing instruction information is executed, the control unit 31 may determine whether or not the information on the mutually contradictory processing instruction operations is included in the processing instruction information. When the information on the mutually contradictory processing instruction operations is included in the processing instruction information, the control unit 31 may delete the information on those processing instruction operations from the processing instruction information. With such a configuration, it is possible to alleviate a processing load relating to the processing for subjecting the original image to processing.

(2) For example, it may be configured that another image can be combined or coupled with/to the process target image 52 on the processing screen 50. In this case, as to the image to be combined with the process target image 52 also, instead of transmitting the image itself from the user device 10 to the second data management device 30, the information for acquiring the image from the first data management system 2 may be transmitted to the second data management device 30. Then, on the second data management device 30 side, the image to be combined with the process target image 52 may also be acquired from the first data management system 2.

(3) For example, the description is made above mainly of the case where the user acquires the still image stored in the first data management system 2, processes the acquired still image, and posts the processed still image onto the second data management system 3. However, the present invention can be applied to a case where the user acquires a moving image stored in the first data management system 2, processes the acquired moving image, and posts the processed moving image onto the second data management system 3. Further, the present invention can be applied to a case where the user acquires a sound stored in the first data management system 2, processes the acquired sound, and posts the processed sound onto the second data management system 3.

(4) For example, on the second data management device 30, the processed data generated by the processed data generation section 86 may be further subjected to predetermined additional processing. Then, the processed data that has been subjected to the predetermined additional processing may be saved to the second database 35.

Here, the "predetermined additional processing" represents, for example, processing imposing a relatively large load, which takes much time when executed by the user device 10.

For example, in the case where the user acquires the moving image or the sound stored in the first data management system 2, processes the acquired moving image or the acquired sound, and posts the processed moving image or the processed sound onto the second data management system 3, encoding processing may be executed for the processed moving image or the processed sound on the second data management device 30 side. With such a configuration, it is not necessary to execute encoding processing imposing high processing load on the user device 10 side.

(5) For example, it is not essential to input the comment relating to the processed image.

Further, the description is made above of the case where the user posts the processed data onto the second data management system 3 in order to make the data public to other users. However, the present invention can also be applied to a case where the user saves the processed data to a system which simply saves the data without making it public to other users.

Further, the second data management device 30 and the first data management device 20 may be the same device, and the second database 35 and the first database 22 may be the same database as well. That is, the present invention can also be applied to a case where the user acquires the image posted on the second data management system 3, processes the image, and posts the processed image onto the second data management system 3. In the same manner, the present invention can also be applied to a case where the user acquires the image saved to the first data management system 2, processes the image, and saves the processed image to the first data management system 2.

(6) For example, the user may select an image put on an arbitrary web page as the process target image.

The invention claimed is:

1. A data processing system, comprising:
a first storage that stores original data;
a data providing device that provides the original data or alternative data with regard to the original data to another device, the alternative data being data generated based on the original data, the data providing device further comprising:
  a section that transmits the original data or the alternative data to a user device through a communication network;
the user device comprising:
  a data receiving section that receives the original data or the alternative data through the communication network,
  a processing instruction receiving section that receives a processing instruction operation performed by a user with data received by the data receiving section as a process target, and
  an original data acquisition information transmitting section that transmits original data acquisition information to a data processing device through the communication network, the original data acquisition information being information which is used to acquire the original data from the first storage,
a processing instruction information transmitting section that transmits processing instruction information to the data processing device through the communication network, the processing instruction information being information relating to a content of the processing instruction operation performed for the process target data;
a second storage that is different from the first storage; and
the data processing device that is different from the data providing device and that accesses the second storage, the data processing device comprising:
  an original data acquisition section that acquires the original data stored in the first storage by requesting the data providing device for the original data stored in the first storage based on the original data acquisition information,
  a processed data generation section that generates processed data by processing the original data acquired by the original data acquisition section based on the processing instruction information, and
  a processed data saving section that saves the processed data to the second storage.

2. The data processing system according to claim 1, wherein:
the user device comprises a section that records a history of the processing instruction operation performed for the process target data into history storage; and
the processing instruction information transmitting section transmits, in a case where the processing with respect to the process target data is completed on the user device, information relating to the history of the processing instruction operation performed for the process target data to the data processing device as the processing instruction information.

3. The data processing system according to claim 1, wherein:
the original data acquisition information transmitting section transmits, before the processing with respect to the process target data is completed on the user device, the original data acquisition information to the data processing device;
the processing instruction information transmitting section transmits, after the processing with respect to the process target data is started on the user device and before the processing with respect to the process target data is completed on the user device, processing instruction information indicating the content of the processing instruction operation that has been performed for the process target data so far to the data processing device;
the original data acquisition section acquires, before the processing with respect to the process target data is completed on the user device, the original data from the first storage; and
the processed data generation section starts, before the processing with respect to the process target data is completed on the user device, the processing with respect to the original data based on the processing instruction information.

4. The data processing system according to claim 1, wherein:
the alternative data is data having a data amount smaller in size than that of the original data;
the data receiving section receives the alternative data through the communication network;
the processing instruction receiving section receives the processing instruction operation performed by the user with the alternative data as the process target;
the processing instruction information transmitting section transmits the processing instruction information relating to the content, of the processing instruction operation performed by the user with the alternative data as the process target to the data processing device through the communication network; and
the processed data generation section generates the processed data by processing the original data based on the processing instruction information relating, to the content of the processing instruction operation performed by the user with the alternative data as the process target.

5. The data processing system according to claim 4, wherein:
the original data is data regarding an original still image;
the alternative data is data regarding a reduced image obtained by reducing the original still image in size; and
the original still image acquired by the original data acquisition section is processed based on the content of the processing instruction operation performed by the user with the alternative data as the process target and a ratio of a size between the original still image and the reduced image, to thereby generate a processed image as the processed data.

6. The data processing system according to claim 5, wherein
a position relating to a processing'to be performed with respect to the original still image is identified based on a position relating to a processing performed with respect to the reduced image by the user and the ratio of the size between the reduced image and the original still image.

7. The data processing system according to claim 6, wherein:
the processing instruction information comprises information indicating the position relating to the processing performed with respect to the reduced image by the user by a coordinate value in a first axial direction within the reduced image and a coordinate value in a second axial direction orthogonal to the first axial direction within the reduced image; and
the processed data generation section comprises:
a first acquisition section that acquires the coordinate value in the first axial direction of the position relating to the processing to be performed with respect to the original still image based on the coordinate value in the first axial direction of the position relating to the processing performed with respect to the reduced image by the user and a ratio of a length in the first axial direction between the reduced image and the original still image;
a second acquisition section that acquires the coordinate value in the second axial direction of the position relating to the processing to be performed with respect to the or still image based on the coordinate value in the second axial direction of the position relating to the processing performed with respect to the reduced image by the user and a ratio of a length in the second axial direction between the reduced image and the original still image; and
a section that generates the processed image by processing the original still image acquired by the original data acquisition section based on the coordinate values acquired by the first acquisition section and the second acquisition section.

8. The data processing system according to claim 6, wherein:
the processing instruction information comprises information indicating the position relating to the processing performed with respect to the reduced image by the user by a first normalized coordinate value and a second normalized coordinate value, the first normalized coordinate value being obtained by dividing a coordinate value in a first axial direction within the reduced image by a length in the first axial direction of the reduced image, the second normalized coordinate value being obtained by dividing a coordinate value in a second axial direction orthogonal to the first axial direction within the reduced image by a length in the second axial direction of the reduced image; and
the processed data generation section comprises:
a first acquisition section that acquires the coordinate value in the first axial direction of the position relating to the processing to be performed with respect to the original still image based on the first normalized coordinate value of the position relating to the processing performed with respect to the reduced image by the user and a length in the first axial direction of the original still image;
a second acquisition section that acquires the coordinate value in the second axial direction of the position relating to the processing to be performed with respect to the original still image based on the second normalized coordinate value of the position relating to the processing performed with respect to the reduced image by the user and a length in the second axial direction of the original still image; and
a section that generates the processed image by processing the original still image acquired by the original data acquisition section based on the coordinate values acquired by the first acquisition section and the second acquisition section.

9. The data processing system according to claim 6, wherein:
the user device comprises:
a first acquisition section that acquires a coordinate value in a first axial direction of the position relating to the processing to be performed with respect to the original still image based on a ratio of a length in the first axial direction between the reduced image and the original still image and a coordinate value in the first axial direction of the position relating to the processing performed with respect to the reduced image by the user; and
a second acquisition section that acquires a coordinate value in a second axial direction orthogonal to the first axial direction of the position relating to the processing to be performed with respect to the original still image based on a ratio of a length in the second axial direction between the reduced image and the original still image and a coordinate value in the second axial direction of the position relating to the processing performed with respect to the reduced image by the user;
the processing instruction information comprises positional information indicating the position relating to the processing to he performed with respect to the original still image by the coordinate values acquired by the first acquisition section and the second acquisition section; and
the processed data generation section identifies the position relating to the processing to be performed with respect to the original still image based on the positional information included in the processing instruction information.

10. The data processing system according to claim 1, wherein:
the original data is data on an original moving image or an original sound;
the processed data generation section generates a processed moving image or a processed sound by processing the original moving image or the original sound acquired by the original data acquisition section based on the processing instruction information:
the data processing device comprises a section that subjects the processed moving image or the processed sound to encoding processing; and
the processed data saving section saves the processed moving image or the processed sound subjected to the encoding processing to the second storage.

11. A control method for a data processing system,
the data processing system comprising;
a first storage that stores original data;
a data providing device that provides the original data or alternative data with regard to the original data another device, the alternative data being data generated based on the original data;
a user device;
a second storage that is different from the first storage; and a data processing device that is different from the data providing device and that accesses the second storage, the control method comprising:

transmitting, by the data providing device, the original data or the alternative data to the user device through a communication network;

receiving, by the user device, the original data or the alternative data through the communication network;

receiving, by the user device, a processing instruction operation performed by a user with the received data as a process target;

transmitting, by the user device, original data acquisition information to the data processing device through the communication network, the original data acquisition information being information which is used to acquire the original data from the first storage;

transmitting, by the user device, processing instruction information to the data processing device through the, communication network, the processing instruction information being information relating to a content of the processing instruction operation performed for the process target data;

acquiring, by the data processing device, the original data stored in the first storage by requesting the data providing device for the original data stored in the first storage based on the original data acquisition information;

generating, by the data processing device, processed data by processing the acquired original data based on the processing instruction info oration; and saving, by the data processing device, the processed data to the second storage.

12. A data processing device that is configured to communicate with a data providing device and a user device, the data providing device being configured to provide original data or alternative data with regard to the original data to another device, the original data being stored in a first storage, the alternative data being data generated based on the original data, the data processing device being different from the data providing device, being configured to access a second storage different from the first storage, and being configured to acquire and process the original data stored in the first storage, the data processing device comprising:

an original data acquisition information receiving section that receives original data acquisition information in a case where the original data acquisition information is transmitted from the user device, the original data acquisition information is information which is used to acquire the original data from the first storage;

a processing instruction information receiving section that receives processing instruction information in a case where the processing instruction information is transmitted from the user device, the processing instruction information being information which indicates a content of a processing instruction operation performed on the user device by using the original data or the alternative data as a process target;

an original data acquisition section that acquires the original data stored in the first storage, by requesting the data providing device for the original data stored in the first storage based on the original data acquisition information;

a processed data generation section that generates processed data by processing the original data acquired by the original data acquisition section based on the processing instruction information; and a processed data saving section that saves the processed data to the second storage.

13. A control method for a data processing device, the data processing device being configured to communicate with a data providing device and a user device, the data providing device being configured to provide original data or alternative data with regard to the original data to another device, the original data being stored in a first storage, the alternative data being data generated based on the original data, the data processing device being different from the data providing device, being configured to access a second storage different from the first storage, and being configured to acquire and process the original data stored in the first storage, the control method comprising:

receiving original data acquisition information in a case where the original data acquisition information is transmitted from the user device, the original data acquisition information being information which is used to acquire the original data from the first storage;

receiving processing instruction information in a case where the processing instruction information is transmitted from the user device, the processing instruction information being information which indicates a content of a processing instruction operation performed on the user device by using the original data or the alternative data as a process target;

acquiring the original data stored in the first storage by requesting the data providing device for the original data stored in the first storage based on the original data acquisition information;

generating processed data by processing the acquired original data based on the processing instruction information; and saving the processed data to the second storage.

* * * * *